US011360470B2

(12) United States Patent
Youmans

(10) Patent No.: US 11,360,470 B2
(45) Date of Patent: Jun. 14, 2022

(54) APPARATUS FOR DETECTING TILT, LEAN, MOVEMENT, ROTATION, OF A USER, RIDER, PAYLOAD

(71) Applicant: Thomas A. Youmans, Los Angeles, CA (US)

(72) Inventor: Thomas A. Youmans, Los Angeles, CA (US)

( * ) Notice: Subject to any disclaimer, the term of this patent is extended or adjusted under 35 U.S.C. 154(b) by 73 days.

(21) Appl. No.: 16/593,385

(22) Filed: Oct. 4, 2019

(65) Prior Publication Data

US 2020/0141828 A1 May 7, 2020

Related U.S. Application Data

(60) Provisional application No. 62/742,363, filed on Oct. 7, 2018, provisional application No. 62/741,999, filed on Oct. 5, 2018.

(51) Int. Cl.
 *G01G 19/44* (2006.01)
 *G01G 19/414* (2006.01)
 (Continued)

(52) U.S. Cl.
 CPC ........... *G05D 1/0016* (2013.01); *B60W 40/11* (2013.01); *B60W 40/112* (2013.01);
 (Continued)

(58) Field of Classification Search
 CPC .. G06F 3/04142; G01G 19/44; G01G 19/445; G01G 19/4142; G01G 19/4144;
 (Continued)

(56) References Cited

U.S. PATENT DOCUMENTS 3,187,826 A * 6/1965 Traff ...................... G01G 19/44
 177/142
4,389,711 A * 6/1983 Hotta .................. G06F 3/04142
 713/300

(Continued)

OTHER PUBLICATIONS

Non-Final Office Action dated Mar. 4, 2021 in U.S. Appl. No. 16/593,346 (20 pages).

(Continued)

*Primary Examiner* — Randy W Gibson
(74) *Attorney, Agent, or Firm* — Stmith, Gambrell & Russell, LLP

(57) ABSTRACT

An apparatus that detects a tilt, lean, movement and/or rotation and/or change in tilt, lean, position and/or rotation of a user, rider, and/or payload which may use sensors configured to accomplish this detection, where sensors may be on, embedded in and/or attached to a structural device, strap, and/or surface of a vehicle, structure or system, where an apparatus of the present invention may be on, part of, in, attached to or connected to a vehicle, structure or system where detecting, measuring and/or determining a lean, tilt, movement and/or rotation or change thereof, of a user, rider, and/or payload, may be desirable; position or movement and/or center of mass or change thereof may be calculated, or detected; calculations, measurements, metrics or detections from the present invention may be an output or the only output of an apparatus that is an embodiment of the present invention.

18 Claims, 16 Drawing Sheets

(51) Int. Cl.
*G01G 19/52* (2006.01)
*G05D 1/00* (2006.01)
*G01C 9/00* (2006.01)
*G01C 23/00* (2006.01)
*B60W 40/11* (2012.01)
*G01M 1/12* (2006.01)
*B60W 40/112* (2012.01)
*B60W 40/114* (2012.01)
*G01M 1/08* (2006.01)
*B60W 40/13* (2012.01)

(52) U.S. Cl.
CPC ............ *B60W 40/114* (2013.01); *G01C 9/00* (2013.01); *G01C 23/00* (2013.01); *G01M 1/08* (2013.01); *G01M 1/122* (2013.01); *B60W 2040/1315* (2013.01)

(58) Field of Classification Search
CPC ............... G01G 19/52; G01G 23/3707; G01G 23/3721; G01G 19/58; G05D 1/0016; B60W 40/11; B60W 40/112; B60W 40/114; B60W 2040/1315; G01C 9/00; G01C 23/00; G01M 1/08; G01M 1/122
See application file for complete search history.

(56) References Cited

U.S. PATENT DOCUMENTS

| | | | | |
|---|---|---|---|---|
| 5,241,308 | A * | 8/1993 | Young | G06F 3/0414 341/34 |
| 5,750,937 | A * | 5/1998 | Johnson | G01G 23/3707 177/199 |
| 5,930,152 | A * | 7/1999 | Dumont | B60N 2/914 700/302 |
| 6,040,532 | A * | 3/2000 | Munch | G01G 19/4142 177/144 |
| 6,345,839 | B1 * | 2/2002 | Kuboki | B60N 2/002 280/735 |
| 6,348,663 | B1 * | 2/2002 | Schoos | B60N 2/002 177/144 |
| 6,392,550 | B1 * | 5/2002 | Najor | A61B 5/18 340/439 |
| 6,546,813 | B2 * | 4/2003 | Hubbard, Jr. | A43B 3/00 73/862.041 |
| 6,840,117 | B2 * | 1/2005 | Hubbard, Jr. | A43B 3/00 177/144 |
| 6,944,544 | B1 | 9/2005 | Prakah-Asante et al. | |
| 7,040,455 | B2 * | 5/2006 | Bogat | A47F 9/047 177/25.15 |
| 7,126,065 | B2 * | 10/2006 | Petrucelli | G01G 17/08 177/25.13 |
| 7,186,930 | B1 * | 3/2007 | Wong | A61B 5/4872 177/25.13 |
| 7,202,424 | B2 * | 4/2007 | Carlucci | A61B 5/4023 177/199 |
| 7,609,168 | B2 * | 10/2009 | Boverie | A61B 5/11 180/273 |
| 7,741,569 | B2 * | 6/2010 | Lin | G01G 19/44 177/126 |
| 7,746,325 | B2 * | 6/2010 | Roberts | G06F 3/04142 345/173 |
| 8,079,251 | B2 * | 12/2011 | Miyanaga | G01G 19/44 73/65.01 |
| 8,485,329 | B1 * | 7/2013 | Roy | G01G 19/58 190/116 |
| 8,600,699 | B2 | 12/2013 | Vock et al. | |
| 8,716,610 | B2 * | 5/2014 | Zyman Beer | G01G 19/58 177/148 |
| 9,289,680 | B2 * | 3/2016 | Yamazaki | A63F 13/212 |
| 9,771,003 | B2 * | 9/2017 | Kolich | G01G 19/4142 |
| 9,910,494 | B2 * | 3/2018 | Westerman | G06F 3/016 |
| 10,005,415 | B2 * | 6/2018 | Muramatsu | B60R 21/01516 |
| 10,994,739 | B2 * | 5/2021 | Giraud | B60W 50/14 |
| 2005/0051586 | A1 * | 3/2005 | Siwak | A45C 13/28 224/576 |
| 2006/0063644 | A1 | 3/2006 | Yang | |
| 2007/0146131 | A1 * | 6/2007 | Boverie | B60N 2/002 340/540 |
| 2009/0165207 | A1 | 7/2009 | Reed et al. | |
| 2013/0140097 | A1 * | 6/2013 | Zyman Beer | G01G 19/56 177/148 |
| 2015/0008710 | A1 * | 1/2015 | Young | B60N 2/976 297/217.3 |
| 2015/0331427 | A1 | 11/2015 | Chaudary | |
| 2016/0023755 | A1 | 1/2016 | Elshafei et al. | |
| 2017/0123063 | A1 | 5/2017 | Yamashita et al. | |
| 2017/0131764 | A1 | 5/2017 | Bognar et al. | |
| 2017/0283086 | A1 | 11/2017 | Garing et al. | |
| 2018/0147478 | A1 | 5/2018 | Wood | |
| 2018/0190006 | A1 | 7/2018 | Overbeck | |
| 2018/0208312 | A1 | 7/2018 | Zapata | |
| 2018/0229837 | A1 | 8/2018 | Kimchi et al. | |
| 2020/0141760 | A1 | 5/2020 | Youmans | |
| 2020/0142396 | A1 * | 5/2020 | Youmans | B60W 40/112 |

OTHER PUBLICATIONS

Final Office Action dated Oct. 6, 2021 in U.S. Appl. No. 16/593,346 (18 pages).

* cited by examiner

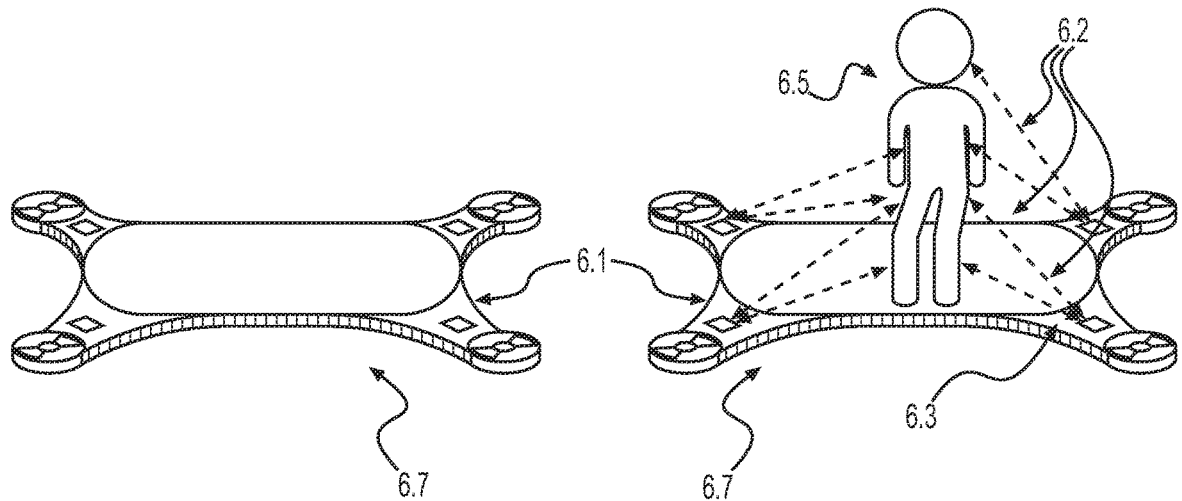
FIG. 6
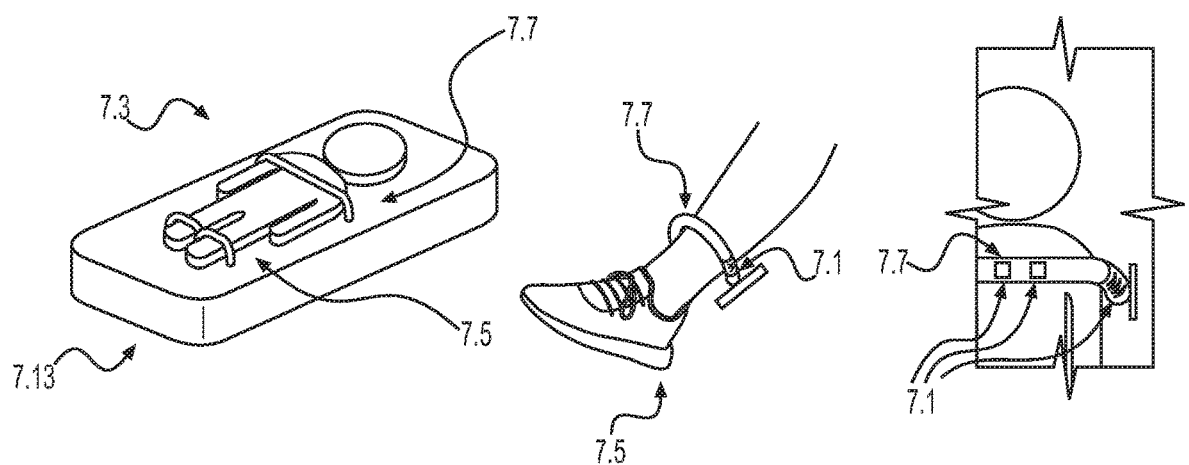
FIG. 7A  FIG. 7B  FIG. 7C

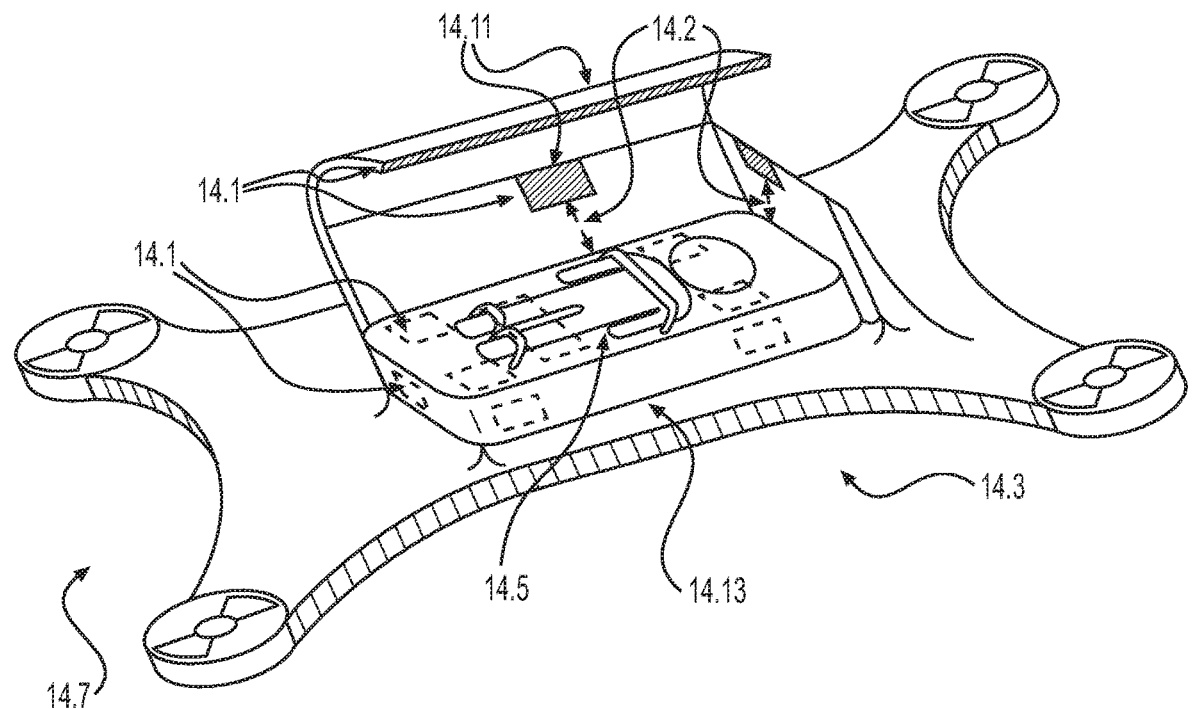
FIG. 14
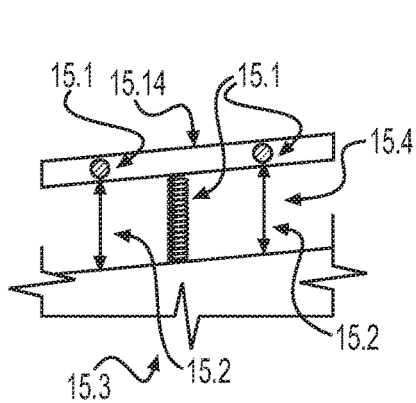 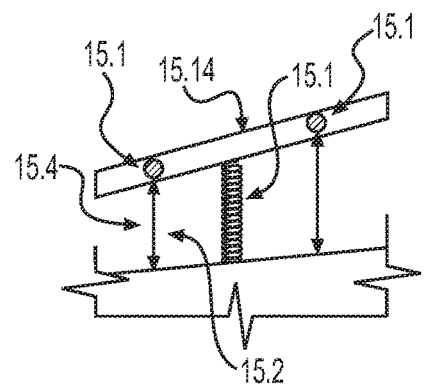
FIG. 15A  FIG. 15B

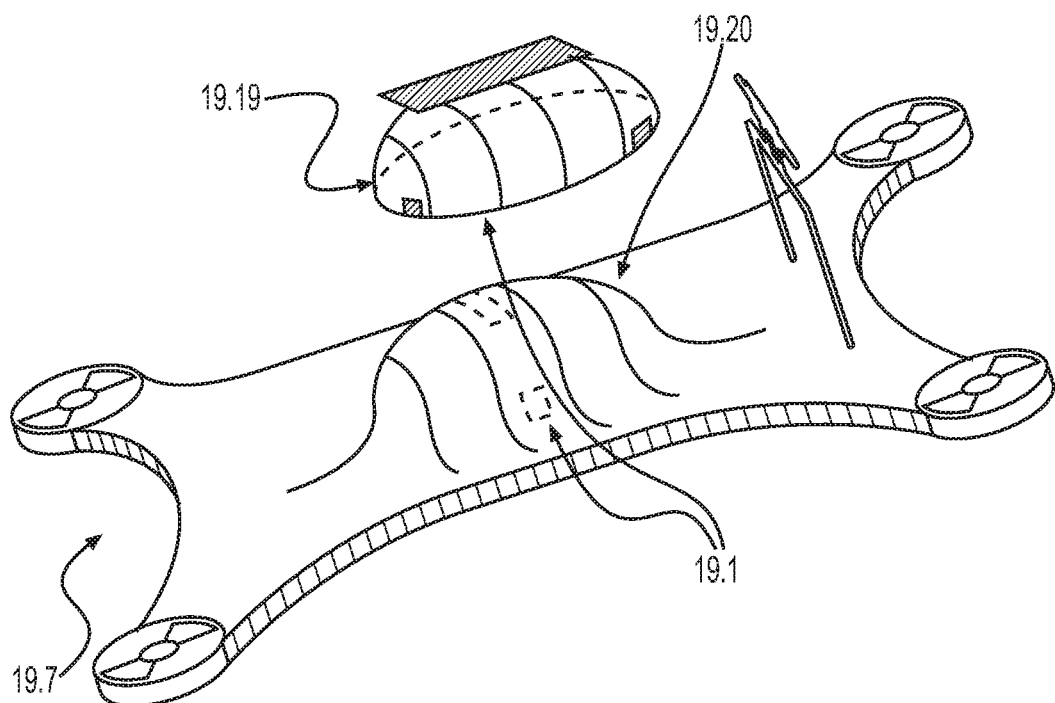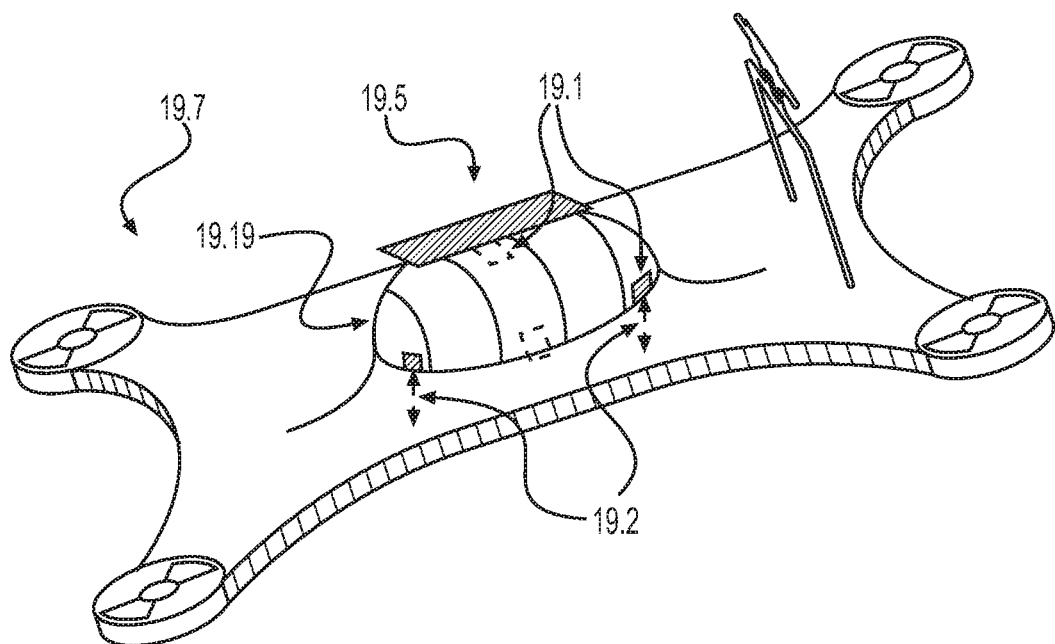
FIG. 19

APPARATUS FOR DETECTING TILT, LEAN, MOVEMENT, ROTATION, OF A USER, RIDER, PAYLOAD

CROSS-REFERENCE TO RELATED PATENT APPLICATION(S)

This patent application claims priority to U.S. provisional application 62/742,363, filed on Oct. 7, 2018, the contents of which are incorporated in their entirety herein. In accordance with 37 C.F.R. § 1.76, a claim of benefit is included in an Application Data Sheet filed concurrently herewith.

FIELD OF THE INVENTION

The present invention relates to a methodology and construction of an apparatus that determines at least one of tilt, lean, or rotation of a user, rider, and/or payload; an apparatus of this nature may be employed on a vehicle or in other use cases. More specifically, detecting the tilt, lean and/or rotation of a user, rider, or payload may be useful information for a system that the user, rider, or payload is part of. When a user, rider, or payload is on a flying vehicle, or a land based or water based vehicle, it may be beneficial to the control and stability of the vehicle to understand and input the tilt, lean, or rotation of a rider or payload into control algorithms or methods of the vehicle—the present invention covers an apparatus that is able to detect tilt, lean, rotation, movement, or change in tilt, lean, rotation, position, and may determine the center of mass or change in center of mass of a user, rider, or payload through at least one of various types of sensors or combinations of sensors.

BACKGROUND OF THE INVENTION

In many systems, a user, rider, or payload is small relative to the system (a person standing on the floor of a building, a glass of water, camera, fire extinguisher or puppy on a table or other structure for example); in these cases, a small movement of the user, person, or object will not drastically change the center of mass of the system (the person in the building or the puppy on the table)—and so detecting their tilt, lean, or rotation, or the change in the center of mass of the system, is not typically performed, especially in how it may relate to control and/or stability of the system. Related art and practices do not typically determine this in a way that.

In some cases, prior art does detect a movement, such as in an automatic door opening detection apparatus, or a video game floor sensor, where a user steps on portions of a floor sensor in a certain order, in order enact dance moves of a video game for example, but these tactics are performed using different structures, sensors, methods and formats than the present invention and do not perform the same function as the present invention.

In some cases, detecting the tilt, lean, or rotation of a person, user, or payload, including an object, may be of value, and the current art in the field does not accomplish these potential needs adequately.

In many vehicles, the vehicle is large relative to a rider or payload, and small movements of a rider or payload may not effect or impact the control or stability of the vehicle. In small vehicles, the changing tilt or rotation of a user, rider, or payload may have an effect or impact on the total center of mass or mass distribution of the system, and this may effect or impact the control or stability of the vehicle.

BRIEF SUMMARY OF THE INVENTION

The present invention comprises an apparatus for the detection of at least one of the tilt, lean, movement, rotation, or change in tilt, lean, movement, or rotation of a user, rider, and/or payload by detecting any of the above with sensors, positioned to determine any of those movements. This may include detecting and/or determining the center of mass, or change in center of mass, of the user, rider, and/or payload or detecting or determining the center of mass, or change in center of mass, of the system comprising a user, rider, and/or payload and the vehicle or system containing a user, rider, and/or payload.

Advances in the methodology and construction of an apparatus that can determine at least one of tilt, lean, movement, rotation, or change in tilt, lean, position or rotation could add value to multiple use cases. Based on the unique combination of material, including hardware, mechanical structures and various types of sensors, in a novel way, to provide a new capability—the detection of at least one of the tilt, lean, rotation, or change in tilt, lean, or rotation through an apparatus as described in the present invention may contribute new capabilities supporting multiple use cases.

If a structural part of a vehicle or system is effected or impacted by a tilt, lean, movement and/or rotation of a user, the tilt, lean, movement and/or rotation of this part of a vehicle or system may be detected using any of the sensing methods described herein, or other methods, in order to determine a tilt, lean, movement and/or rotation of user, rider, and/or payload, and/or center of mass and/or change in center of mass, where change may include direction and/or magnitude.

These combinations of sensors and sensor locations, as well as straps on, around, or connected to a user, rider, and/or payload, or tilting, leaning, moving and/or rotating pieces of a vehicle are examples of embodiments of the present invention, but are not an exhaustive list, and do not represent all embodiments of the present invention, which comprises an apparatus for detecting a tilt, lean, movement and/or rotation of a user, rider, and/or payload.

In an embodiment, an apparatus may comprise a portion of the apparatus configured to hold at least one object, at least one sensor attached to the portion of the apparatus, the sensor configured to detect a change or perturbation of at least one parameter relating to the at least one object, and a computational device configured to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object based on the change or perturbation detected by the sensor.

In embodiments, the at least one parameter may comprise at least one of a weight, a force, a tension, or a stress generated by the at least one object. The at least one object may comprise at least one of a user, a rider, or a payload. The computational device may be configured to further determine at least one of a magnitude and a direction in which the at least one object shifts, slides, or rotates in order to determine the tilt, lean, or rotation of the at least one object. The computational device may be further configured to use the detected or measured movement or perturbation to determine at least one of a center of mass, a center of gravity, a change in the center of mass, and a change in the center of gravity of the object. The at least one sensor may comprise a plurality of sensors, including at least one of measurement devices, physics measuring systems, and remote measurement systems.

The at least one sensor may be further configured to detect or measure a magnitude or direction of a movement or perturbation of a piece of the apparatus and the computational device may be further configured to use the detected or measured movement or perturbation to determine at least one of a tilt, a lean, a shift, a rotation, a slide, a position, a movement, or a rotation of the at least one object or to determine a change in at least one of a tilt, a lean, a shift, a rotation, a slide, a position, a movement, and a rotation of the at least one object. The computational device may be further configured to use the detected or measured movement or perturbation to determine at least one of a center of mass, a center of gravity, a change in the center of mass, and a change in the center of gravity of the object.

The at least one parameter may comprise at least one of a distance, a location, a position or a change thereof and the sensors comprise at least one of electromagnetic sensors, lidar sensors, radar sensors, sonar sensors, optical sensors or laser systems configured to detect at least one of a position and density of the at least one object. The at least one object may comprise at least one of a user, a rider, or a payload. The computational device may be configured to further determine at least one of a magnitude and a direction in which the at least one object shifts, slides, or rotates in order to determine the tilt, lean, or rotation of the at least one object. The computational device may be further configured to use the detected or measured movement or perturbation to determine at least one of a center of mass, a center of gravity, a change in the center of mass, and a change in the center of gravity of the object. The at least one sensor may comprise a plurality of sensors, including at least one of measurement devices, physics measuring systems, and remote measurement systems.

The at least one sensor may be further configured to detect or measure a magnitude or direction of a movement or perturbation of a piece of the apparatus and the computational device may be further configured to use the detected or measured movement or perturbation to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object. The computational device may be further configured use the detected or measured movement or perturbation to determine at least one of a center of mass, a center of gravity, a change in the center of mass, or a change in the center of gravity of the object. The at least one sensor may be configured to measure at least one of a distance, a position, a change in position, a volume, a change in volume, a surface, a surface location, a changes in surface location, a linear distance, a non-linear distance, a distance with respect to at least one reference points or sensor location, a distance from the object to the at least one sensor, a distance from the object to a reference point, distances from the object to a plurality of reference points, distances from a plurality of points on the object to the at least one sensor or at least one reference point, and any changes thereof. The at least one object may comprise at least one of a user, a rider, or a payload.

The computational device may be further configured to use the detected or measured movement or perturbation to determine at least one of a center of mass, a center of gravity, a change in the center of mass, and a change in the center of gravity of the object. A virtual map of an area with a user rider or payload is created and this virtual map may be used to determine a perturbation in positioning of a user rider or payload. A virtual map of an area with a user rider or payload may be created using at least one of sensors including weight sensors, distance measuring sensors, remote sensors, or electromagnetic sensors. A detected perturbation in positioning of a user rider or payload, included within a virtual map of an area, may be used to determine center of gravity or center of mass, or change in center of gravity or center of mass. The at least one sensor is further configured to detect or measure a magnitude or direction of a movement or perturbation of a piece of the apparatus and the computational device is further configured to use the detected or measured movement or perturbation to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object. The computational device may be further configured use the detected or measured movement or perturbation to determine at least one of a center of mass, a center of gravity, a change in the center of mass, and a change in the center of gravity of the object.

In an embodiment, an apparatus may comprise a platform configured to hold at least one object, at least one sensor attached to the platform, the sensor configured to detect a change or perturbation of at least one of a weight, a force, a tension, and a stress generated by the at least one object, and a computational device configured to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object based on the change or perturbation detected by the at least one sensor.

In embodiments, the at least one object may comprise at least one of a user, a rider, or a payload. The computational device may be configured to further determine at least one of a magnitude and a direction in which the at least one object shifts, slides, or rotates in order to determine the tilt, lean, or rotation of a user, rider, or payload. The at least one sensor may comprise a plurality of sensors, including at least one of measurement devices, physics measuring systems, and remote measurement systems. The computational device may be further configured to use the detected or measured movement or perturbation to determine at least one of a center of mass, a center of gravity, a change in the center of mass, and a change in the center of gravity of the object. The at least one sensor may comprise a plurality of sensors arranged in a radial pattern. The at least one sensor may be further configured to detect or measure a magnitude or direction of a movement or perturbation of a piece of the apparatus and the computational device is further configured to use the detected or measured movement or perturbation to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object. The computational device may be further configured use the detected or measured movement or perturbation to determine at least one of a center of mass, a center of gravity, a change in the center of mass, and a change in the center of gravity of the object. The platform may be on one of a ground, a flat surface, or a semi flat surface. The flat surface or semi flat surface may be one of a floor, a wall, a curved wing type shape, or a vehicle surface.

In an embodiment, an apparatus may comprise a chair configured to hold at least one object, the chair comprising platform surface and a seat-back surface, at least one sensor attached to at least one of the platform surface or the seat-back surface, the at least one sensor configured to detect a change or perturbation of at least one of a weight, a force, a tension, and a stress generated by the at least one object, and a computational device configured to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object based on the change or perturbation detected by the at least one sensor.

In embodiments, the at least one object comprises at least one of a user, a rider, or a payload. The computational device may be configured to further determine at least one of a magnitude and a direction in which the at least one object shifts, slides, or rotates in order to determine the tilt, lean, or rotation of a user, rider, or payload. The computational device may be further configured to use the detected or measured movement or perturbation to determine at least one of a center of mass, a center of gravity, a change in the center of mass, and a change in the center of gravity of the object. The at least one sensor may comprise a plurality of sensors, including at least one of measurement devices, physics measuring systems, and remote measurement systems. The at least one sensor may be further configured to detect or measure a magnitude or direction of a movement or perturbation of a piece of the apparatus and the computational device is further configured to use the detected or measured movement or perturbation to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object. The computational device may be further configured use the detected or measured movement or perturbation to determine at least one of a center of mass, a center of gravity, a change in the center of mass, and a change in the center of gravity of the object. The chair further may comprise two arms each having at least one sensor attached thereto.

In an embodiment, an apparatus may comprise a platform configured to hold at least one object, at least one sensor attached to the platform, the sensor configured to detect a change or perturbation of a distance from the at least one sensor to the at least one object, and a computational device configured to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object based on the change or perturbation detected by the at least one sensor.

In embodiments, the at least one object may comprise at least one of a user, a rider, or a payload. The computational device may be configured to further determine at least one of a magnitude and a direction in which the at least one object shifts, slides, or rotates in order to determine the tilt, lean or rotation of a user, rider or payload. The computational device may be further configured to use the detected or measured movement or perturbation to determine at least one of a center of mass, a center of gravity, a change in the center of mass, and a change in the center of gravity of the object. The at least one sensor may be configured to perform remote sensing or electromagnetic wave based sensing. The at least one sensor may comprise a plurality of sensors configured to detect a plurality of areas of the object. The at least one sensor may be further configured to detect or measure a magnitude or direction of a movement or perturbation of a piece of the apparatus and the computational device is further configured to use the detected or measured movement or perturbation to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object. The computational device may be further configured use the detected or measured movement or perturbation to determine at least one of a center of mass, a center of gravity, a change in the center of mass, and a change in the center of gravity of the object.

In an embodiment, an apparatus may comprise a strap configured to hold at least one object, at least one sensor attached to the strap, the sensor configured to detect a change or perturbation of a force on the object or a distance from the at least one sensor to the at least one object, and a computational device configured to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object based on the change or perturbation detected by the at least one sensor.

In embodiments, the at least one object may comprise at least one of a user, a rider, or a payload. The computational device may be configured to further determine at least one of a magnitude and a direction in which the at least one object shifts, slides, or rotates in order to determine the tilt, lean or rotation of a user, rider or payload. The computational device may be further configured to use the detected or measured movement or perturbation to determine at least one of a center of mass, a center of gravity, a change in the center of mass, and a change in the center of gravity of the object. The at least one sensor may be positioned tangential to the strap, perpendicular to the strap, or non-perpendicular to the strap. The strap may be mounted on a horizontal support structure. The horizontal support structure may comprise a bed and the strap may be configured to restrain a person. Sensing may be accomplished by at least one sensor comprises a plurality of sensors, including at least one of measurement devices, physics measuring systems, and remote measurement systems, including weight, distance or other measurable parameters. The strap may be configured to attach the apparatus to a person. The at least one sensor may be further configured to detect or measure a magnitude or direction of a movement or perturbation of a piece of the apparatus and the computational device may be further configured to use the detected or measured movement or perturbation to determine at least one of a tilt, a lean, a shift, a rotation, a slide, a position, a movement, and a rotation of the at least one object or to determine a change in at least one of a tilt, a lean, a shift, a rotation, a slide, a position, a movement, and a rotation of the at least one object. The computational device may be further configured use the detected or measured movement or perturbation to determine at least one of a center of mass, a center of gravity, a change in the center of mass, and a change in the center of gravity of the object.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

FIG. 6 an embodiment of an electromagnetic wave based sensor apparatus of a tilt, lean, movement or rotation detector on a standing personal flight vehicle;

FIG. 7A an embodiment of a strap method of detecting tilt, lean, movement or rotation of user, rider, or payload with a user, rider, and/or payload on a horizontal type support structure, like a bed;

FIG. 7B is a zoomed in view of a portion of FIG. 7A, highlighting an extremity or payload strap type structure including a sensors, a force and/or weight structure, parallel with the strap type structure;

FIG. 7C is another zoomed in view of FIG. 7A, highlighting a torso or payload type strap configuration including sensors parallel to a strap type structure, perpendicular to a strap type structure, and non-perpendicular to a strap type structure;

FIG. 14 shows an embodiment of the apparatus of the present invention where the apparatus is employed in a bed-like, or horizontally based, support structure, where weight or force and electromagnetically based sensors are employed around a user, rider, or payload on a flight vehicle;

FIG. 15A is a generic 2D embodiment of a flexible mechanism implementation of the present invention, where a flexible adjoinment mechanism is used with electromagnetic wave based distance sensors;

FIG. 15B is a generic 2D embodiment of a flexible mechanism implementation of the present invention, in a state tilted from FIG. 15A, where a flexible adjoinment mechanism is used with electromagnetic wave based distance sensors;

FIG. 19 shows an apparatus for an embodiment of the present invention comprising a slide and pivot-rotate mechanism, where a structural element is able to pivot, rotate and/or slide, and weight, force and/or distance may be measured;

DETAILED DESCRIPTION OF THE INVENTION

Figure 1A:
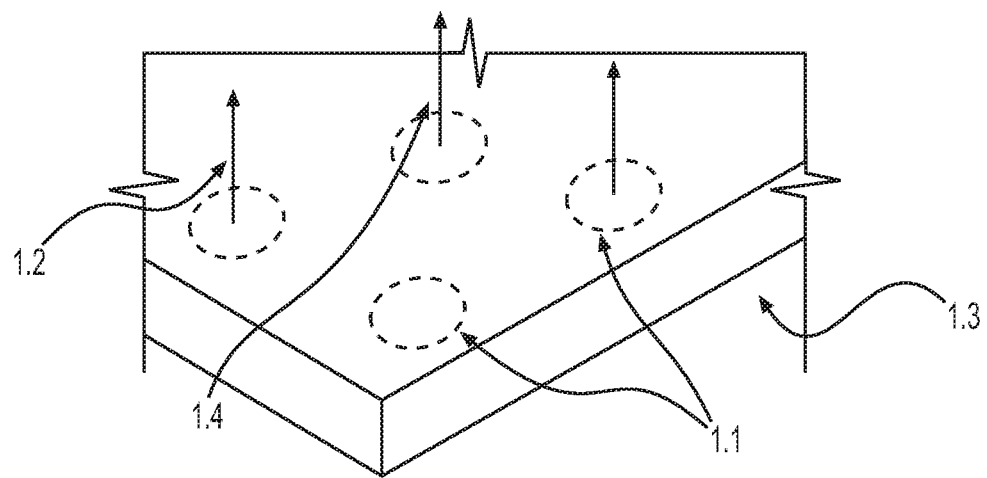
FIG. 1A shows a generic embodiment of multiple weight sensors in a platform recording different amounts of force in accordance with the present invention.

The following details cover embodiments of the present invention, but are not an exhaustive list of embodiments of the present invention.

An apparatus that detects the tilt, lean and/or rotation of a user, rider, and/or payload as described in the present invention may contain weight sensors, force sensors, length or distance measuring sensors of a mechanical or optical or electromagnetic wave based or remote sensing variety, optical or electromagnetic wave based or remote sensing sensors that map a 3D area or volume that may contain some or all of a user, rider, and/or payload, optical or electromagnetic wave based or remote sensing sensors that measure the density of an object and may include radar, laser, lidar, x-ray, or other remote sensing sensors or methodologies, sonar or magnetic sensors that otherwise determine a lean, tilt, movement and/or rotation of a user, rider, or payload, or other sensors which individually or in combination, determine the tilt, lean, or rotation of a user, rider, or payload as described in the present invention. Additional sensor methods may include flexible connection mechanisms, pivot mechanisms, sliding mechanisms or other hard or fixed, flexible or mobile or other mechanisms, that allow a part of the structure of a vehicle or system to lean, tilt, move and/or rotate based on the tilt, lean, movement and/or rotation of a user, rider, and/or payload, and to have that perturbation detected by any sensing types described within the present invention or that accomplish the same purpose. This is not an exhaustive list of potential sensors or sensor type that fall within the scope of the apparatus described in the current invention.

Sensors as described above or that accomplish similar functions may be positioned beneath where a user, rider, or payload rests, adjacent to and/or surrounding or above where a user, rider, or payload is, and/or within or connected to straps that are around a user, rider, and/or payload, and/or straps that are connected to, between or around mechanical structures of a vehicle which receive, detect or are effected or impacted by a lean, tilt, movement and/or rotation of a user, rider, and/or payload. This is not an exhaustive list of potential configurations or locations of sensing devices that fall within the scope of the apparatus described in the current invention.

Sensors may also be on, in, or otherwise a part of other pieces of a vehicle or system employing the apparatus described in the present invention. For example, an apparatus as described within the present invention may be comprised of sensors on a wing of a flight vehicle, facing in and using remote sensing to detect movement of a user, or for example on the hood of a car, detecting with remote sensing, movement or tilting of a payload within or on top of a car, or for example on a floor, wall and/or ceiling, detecting movement, tilt, lean and/or rotation and/or center of mass and/or change in center of mass of a user, rider, or payload. This is not an exhaustive list of potential configurations or locations of sensing devices that fall within the scope of the apparatus described in the current invention.

Above mentioned sensors, or other sensors that accomplish the same purpose, positioned in the above mentioned manner, or another manner that accomplishes the same purpose, are used to determine a tilt, lean, movement and/or rotation of a user, rider, or payload by detecting at least one of weight, force, position, location, 3D density or location map, or change in weight, force, position, location, 3D density or location map—such that if a set of sensors is currently measuring the force of a payload on that sensor or other metric as in a quantity that is measured by any of the above mentioned sensors, where each sensor measures a certain force, and then the user, rider, and/or payload tilts, leans, moves and/or rotates, each individual force sensor then detects a different force—and the change in tilt, lean, movement, and/or rotation, or position, of the user, rider, or payload is determined.

Onboard computational capabilities may have a continuous estimation of a position, lean, tilt, and/or rotational orientation or center of mass of a user, rider, and/or payload, and this may be continuously updated every second, milli- second or other time interval, and when a change occurs, a new estimate of a position, lean, tilt, and/or rotational orientation or center of mass of a user, rider, and/or payload may be calculated. Additionally, the detected change, and accompanying metrics, such as weight or force on certain sensors and/or center of mass change, direction and/or magnitude of change, likewise change in distance, position, 3D mapping, or otherwise, may be passed directly to another algorithm, such as another control algorithm on a vehicle, or another algorithm or computer body of part of a system.

If sensors are positioned adjacent to a user, rider, or payload, the sensors may experience no force, until a user, rider, or payload tilts into adjacent sensors, and then the sensors record a force, and a new position of a rider, user and/or payload, or tilt, lean, movement and/or rotation of is user, rider, and/or payload is determined.

Likewise, in a similar fashion, remote sensors employed around a user, rider, and/or payload may detect a distance from a set point to a user, rider, and/or payload, such that if a user, rider, and/or payload tilts, leans, moves and/or rotates, the change in distance for each sensor measurement is determined, and this is used to determine a tilt, lean, movement and/or rotation of a user, rider, and/or payload.

Likewise, if a strap is on, around or connected with a user, or a on structural part of a vehicle or system that is effected or impacted by a tilt, lean, movement and/or rotation of a user, rider, and/or payload, the measurements from such sensors, and the measurements from such sensors following a tilt, lean, movement and/or rotation of a user, rider, and/or payload, may be used to determine a tilt, lean, movement and/or rotation of a user, rider, and/or payload, and/or center of mass and/or change in center of mass, where change may include direction and/or magnitude.

f a structural part of a vehicle or system is effected or impacted by a tilt, lean, movement and/or rotation of a user, the tilt, lean, movement and/or rotation of this part of a vehicle or system may be detected using any of the sensing methods described herein, or other methods, in order to determine a tilt, lean, movement and/or rotation of user, rider, and/or payload, and/or center of mass and/or change in center of mass, where change may include direction and/or magnitude.

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

The present invention comprises an apparatus for the detection of at least one of the tilt, lean, movement, rotation, or change in tilt, lean, movement, or rotation of a user, rider, and/or payload by detecting any of the above with sensors, positioned to determine any of those movements. This may include detecting and/or determining the center of mass, or change in center of mass, of the user, rider, and/or payload or detecting or determining the center of mass, or change in center of mass, of the system comprising a user, rider, and/or payload and the vehicle or system containing a user, rider, and/or payload.

Sensors may be devices which measure, determine, or observe or are affected by a change in something measurable or detectable around on or near them, and may be positioned beneath where a user, rider, and/or payload rests, either in a platform, a structure, a strap, a seating area as with sensors built into a seat, or standing as with sensors built into a standing platform, built into armrests, built into footwells of a user, rider, or passenger area, and/or built into walls to detect the lean of a user, rider, or payload.

Sensors may also be near to a user, rider, and/or payload, with sensors able to detect, from the side, or not directly underneath, a user, rider, and/or payload, the change in tilt, lean, or rotation, and may determine the center of mass or change in center of mass of the user rider and/or payload. In addition to, or when sensors are not, beneath a user, rider, and/or payload, sensors may be built into the cabin (as in an airplane cockpit cabin for example) around the user, rider, or payload—may be in footwells where the user or riders feet may be when in a sitting or standing position, or may be embedded into the body of a vehicle, such that with optical, electromagnetic or other sensors, the sensors can detect, remotely and without toughing the user, rider, or payload, the tilt, lean and/or rotation, or change in tilt, lean and/or rotation, of the user, rider, or payload.

Detecting the tilt, lean, or rotation of a user, rider, or payload using sensors as described in the present invention may entail a weight sensor under one part of the user, rider, or payload sensing an increase in weight, whereas another sensor detects a decrease in weight—and thus determines a tilt, lean, or rotation, and may detect the center of mass or change in center of mass, of the user, rider, or payload. In this case, weight as detected by the sensors is considered to be the force the sensor detects, from supporting the payload, where this force can be measured and analyzed in Newtons.

Additionally, detecting the tilt, lean, or rotation of a user, rider, or payload using sensors as described in the present invention may entail a weight sensor near to the user, rider, or payload sensing an increase in weight, whereas another sensor detects a decrease in weight—such that if the sensors are next to the user, rider, or payload, contained within armrests or interior walls of a cabin or cockpit in which the user, rider, or payload is, a sensor on one side of the user, rider, or payload may detect the user, rider, or payload leaning into that sensors, or increasing the weight with which the user, rider, or payload exerts on that sensors, thereby detecting a tilt, lean, or rotation of a user, rider, or payload.

Furthermore, in the case where optical or electromagnetic sensors or other remote sensor devices are used, or other sensors capable or remote sensing, the sensors may be mounted such that they are not touching the user, rider, and/or payload, and they may, by sensing the location of the user, rider, or payload, observe a change in position of the user, rider, or payload by mapping the 3-dimensional space where the user, rider, or payload may be, or measuring linear (or other type of distance or metric) from the sensor location or another set-point, to many points within the space of where a user, rider, or payload may be, and by detecting changing of position within that area, use that change of position information to inform calculations that determine a center of mass, or a continually updated center of mass, of the user, rider, or payload.

Beyond the weight sensors, electromagnetic wave based sensors and other sensors as described, straps with tension, stress, stretch or other sensors may be employed to determine the tilt, lean, rotation, movement, or change in tilt, lean, movement or rotation of a user, rider, or payload. By determining different amounts of tension or amount of force at the base of straps, or through weight or force sensors within the straps, either perpendicular to the straps or otherwise not tangential to the straps, either detecting force tangentially along the strap or inward or outward facing into the user, rider, or payload, the tilt, lean, movement or rotation or change in tilt, lean, movement or rotation of a user rider or payload, and the center of mass or change in center of mass, may be determined.

Other sensors may accomplish similar objectives as the optical or electromagnet wave based sensors—magnetic sensors may detect a change in magnetic or electric field, and thus determine a change in position of a user, rider, or payload—as one, of many, potential examples, not expressly presented here.

Additionally, multiple methods of detecting a tilt, lean, or rotation of a user, rider, or payload may be enacted concurrently. A seat with weight sensors, in combination with an optical sensor to map the 3-dimensional space of where a user, rider, or payload is, may combine the results of each sensor or set of sensors. This may provide more accurate tilt, lean, rotation, center of mass or change in tilt, lean, rotation or center of mass determinations, or may provide redundant methods of making these determinations—adding trustworthiness to the results, and/or providing backup information in the case that another sensing method encounters an error.

Specifically, and in addition to sensors, positions and combinations thereof described above, an embodiment of the present invention may comprise sensors, in the format, pattern, or location of: single sensor, as for example a platform on a spring or pivot point, a grid of sensors, a plurality of sensors in multiple areas, sections, quadrants or locations, a polar-coordinate based set of sensors, and/or a combination of multiple locations.

A non-exhaustive list of usable sensors may include: sensors that detect weight or change in weight, sensors that detect distance or change in distance, mechanical sensors such as a rod where the amount of the extension of the rod is measured or the weight or force that the rod experienced is measured, weight sensors including magnetometers, accelerometers, springs, hydraulics or other mechanical components, sliding bases mechanisms, where a portion of a seat or another part of an apparatus as described within is able to slide and/or rotate and the degree to which it slides or rotates is used in determining tilt, lean, or rotation of a user, rider, or payload, sensors with sliding or flexing components, where a part of a seat, seat back, standing platform can slide in a direction, or flex in a direction, whereby a movement of a piece of the apparatus, in magnitude, direction, or if there is a perturbation in that piece, is measured or detected, and that measurement or detected movement is used in determining the tilt, lean, or rotation, or change in tilt, lean, or rotation, of a user, rider, or payload—gyroscopes or accelerometers or acceleration or sudden movement or change in movement based sensors, a combination of multiple sensors, and/or other mechanical sensors that perform the duties required to meet the needs of the present invention.

One or more sensors may be also be placed, positioned and/or embedded: in the seat of a vehicle, may be in the form of a platform on a which a user, rider, or payload, rests, stands or is otherwise supported, may be in the seat-back of a seat, or mechanical structure on which a user, rider of payload leans, or tilts against, may be the interior or exterior walls of an enclose in which the user, rider, or payload is, may be built into the handle section or the mechanical support section of controls used with a vehicle employing or containing an apparatus as described in the present invention Additionally, sensors may be placed on straps or other mechanical connection devices, either directly on or around a user, rider, or payload, or connected to or on or around a structural element, that is effected or impacted by tilt, lean, movement or rotation, or change in tilt, lean, movement, or rotation of a user, rider, or payload. On straps on or around a user, rifer or payload, sensors may be either tangentially along the straps, to detect increasing tension in a strap, or increasing force at the edges of a strap, where the strap is connected to another part of a structure, or may be placed perpendicular to, or otherwise not tangential or parallel with the strap, in order to determine tilt, lean, movement, rotation, or change in tilt, lean, movement, or rotation, of a user, rider, or payload. Straps may be placed around any part of a user, rider, or payload, or may be placed around any part of a structure of the system that is effected or impacted by tilt, lean, movement or rotation, or change in tilt, lean, movement, or rotation of a user, rider, or payload. The sensors may include weight, force or tension sensors, as well as distance measuring sensors and/or electromagnetic wave based sensors, or other sensors. The inputs from the sensors in strap of mechanical connection devices or structures can be used, individually or in combination, to determine tilt, lean, movement or rotation, or change in tilt, lean, movement, or rotation of a user, rider, or payload.

Where other sensors such as: cameras or image sensors that optically are used to determine the tilt, lean, or rotation of a user, rider, or payload (where image sensors may be considered remote sensing sensors), where cameras of optical sensors may determine the location, change of location, or tilt, lean, or rotation of one or more parts of the user, rider, or payload, where electromagnetic wave bases sensors are used to determine the tilt, lean, or rotation of a user, rider, or payload, where electromagnetic wave bases sensors are used to determine the location, change of location, or tilt, lean, or rotation of one or more parts of the user, rider, or payload, radar or lidar bases sensors, sensors that can measure the weight or density of a materials or may make these determinations through remote sensing, x-ray type sensors, other remote sensing devices, and/or a combination of multiple electromagnetic and/or mechanical and/or other sensors.

In addition to including them within piece of a structure, the present invention may be accomplished by other formats of sensors, in addition to the locations described above, these sensors may be placed: on a surface of a vehicle, platform of system, or placed on a wing, hanging support structure or vertically mounted support structure on a flight vehicle or personal flight suit or exoskeleton.

Additionally, the detection of tilt, lean and/or rotation of a user, rider, or payload may be determined by a non-fixed portion of a vehicle, platform or system, that tilts and/or rotates relative to another portion of the vehicle, platform or system, which detects, by tilting or rotating relative to the other portion of the vehicle, platform or system—the tilt, lean, or rotation of a user, rider, or payload—and where this movement of a piece of a vehicle, platform and/or system may be detected in any of the above manners.

Where each, any, and all combinations of any, and all, of the above specified methods of sensor pattern, type, location, and/or methodology is an embodiment of the present invention, but not an exhaustive list of embodiments of the present invention.

For determining a location and/or position, and/or relative position of a user, rider, and/or payload may be calculated, or the amount and direction of a tilt, lean, movement and/or rotation of a user rider and/or payload may be a direct input into another control algorithm or method employed by a vehicle or system (the tilt, lean, movement and/or rotation may not be directly calculated by the present invention, but detected and quantified, and passed to another control algorithm). Either of these comprise detecting tilt, lean, movement and/or rotation of a user, rider, and/or payload, and this are within the scope of the apparatus of the present invention (although not exhaustive of the scope of the present invention).

A tilt, lean, movement and/or rotation or a change in tilt, lean, position and/or rotation of a user, rider, or payload is determined by sensors having a current measurement of weight, force, distance, length, position or 3D mapping, and at a subsequent time interval, or a different quantity is measured, this difference is used to determine an new (and now current, after this movement) tilt, lean, movement and/or rotation or a change in tilt, lean, position and/or rotation of a user, rider, or payload.

A continuous control loop may be used, where sensors record a tilt, lean, position of a user, rider, and/or payload every second, millisecond, or other time interval, or an updated if measured tactic may be used, where an update is only made if a sensor records a new detection, or a detection above a threshold value.

FIG. 1A shows a generic embodiment of multiple weight sensors in a platform recording different amounts of force, before a movement of a user, rider, or payload, with the magnitudes of the force proportional to the lengths of the arrows shown.

Figure 1B:
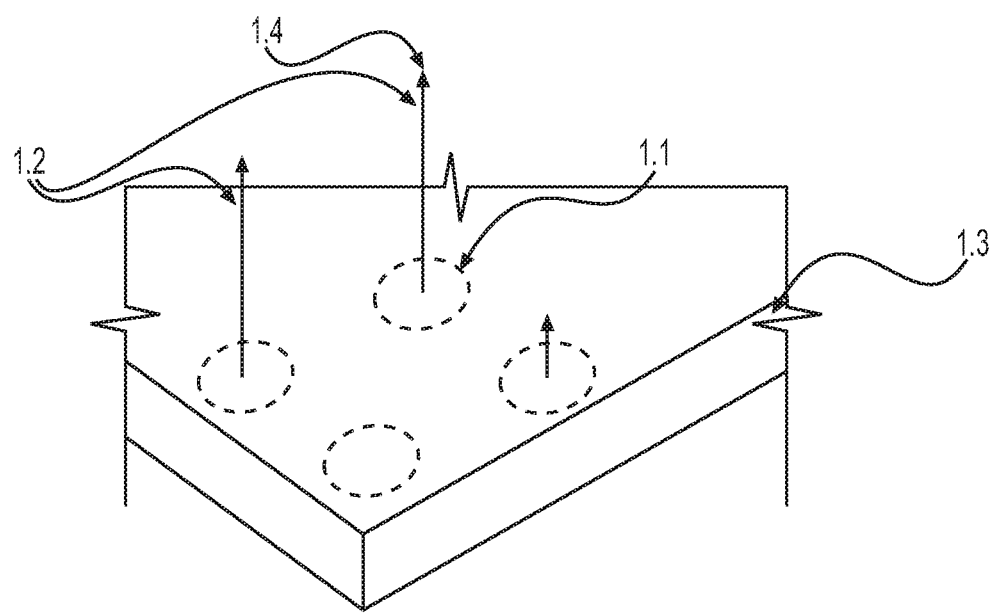
FIG. 1B shows the generic embodiment of multiple weight sensors in a platform of FIG. 1A, recording different amounts of force, after the movement of a user, rider, or payload, with the magnitudes of the force proportional to the lengths of the arrows shown.

FIG. 1B shows the generic embodiment of multiple weight sensors in a platform of FIG. 1A, recording different amounts of force, after the movement of a user, rider, or payload, with the magnitudes of the force proportional to the lengths of the arrows shown, where the amount of force and changing amount of force detected by the sensors can be used to determine a tilt, lean, movement or rotation of a user, rider, or payload.

1.1 shows sensors, including weight or force sensors; 1.2 shows force lines, of lengths proportional to the amount of force detected by the force sensors, 1.3 a generic platform based embodiment of the present invention, housing force sensors in a grid type pattern, 1.4 shows the changing quantities of force measured by sensors, before and after a tilt, lean, movement and/or rotation of a user, rider, and/or payload.

To elaborate, FIG. 1A shows a generic embodiment of the present invention housed in a platform using force sensors—where the length of the arrows 1.2 is proportional to the force measured by the sensors 1.1, where the force sensors 1.1 detect the force exerted by the user, rider, and/or payload, and the detected force 1.2 is a quantity, and that value is then used in a calculation; where in for example FIG. 1A, the user, rider, and/or payload is in a given position, that yields the forces as shown 1.2 prior to a tilt in FIG. 1A, and a user, rider, and/or payload tilts, leans, moves, and/or rotates, the updated forces detected by the sensors 1.2 in FIG. 1B detect different forces, and these new forces may be used in a calculation of a new or updated tilt, lean, position, and/or rotation or center of mass, based on the change in tilt, lean, movement and/or rotation of a user, rider, and/or payload. Increasing forces measured by a sensor 1.4 during the course of a tilt or movement, captured in 1.4, in a user indicate that more of the center of mass may be shifting to the area above that or those sensors. The summation of changing forces per sensor, 1.4 highlighting the effect, movement, on only one sensor, may inform the estimated new tilt, angle, position and/or rotation and/or center of mass of a user, rider, and/or payload, and may be an input to equations used in determining an updated tilt and/or center of mass. The quantities of the forces, per sensor, are combined using typical and/or complex mathematical functions, and may yield a new estimate for a center of mass of a user, rider, and/or payload.

Furthermore, a new position, or tilt, lean, and/or rotation may not be calculated, but instead the measured difference of the sensors may be passed directly to a control algorithm, or other control mechanism, and thusly, by detecting the tilt, lean, movement and/or rotation, the apparatus enacts it's detection of tilt, lean, movement and/or rotation of a user, rider, and/or payload, and thusly is considered within the scope of the present invention.

Figures 2A, 2B:
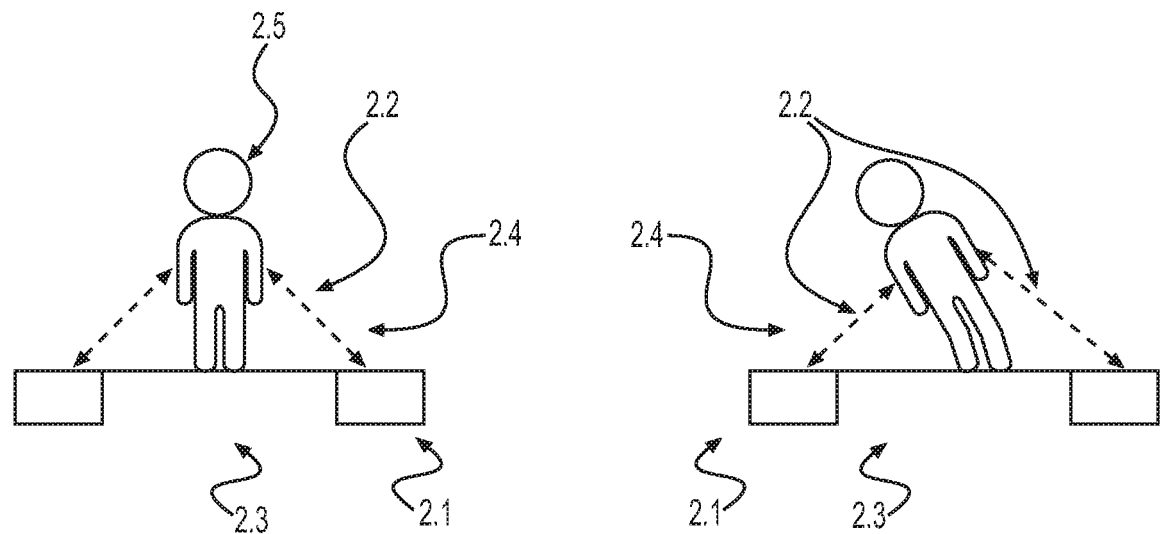
FIG. 2A shows a generic 2D embodiment of the invention employing electromagnetic wave based or remote sensing sensors, sensing distance.
FIG. 2B shows the generic 2D embodiment employing electromagnetic wave based or remote sensing sensors, sensing distance from FIG. 2A after a movement of a user or rider.

FIG. 2A shows a generic 2D embodiment employing electromagnetic wave based or remote sensing sensors, sensing distance, showing the distances measured by two sensors from an initial fixed point, in this case the sensors, to a user, rider, or payload.

FIG. 2B shows the generic 2D embodiment employing electromagnetic wave based or remote sensing sensors, sensing distance, showing the distances measured by two sensors from an initial fixed point of FIG. 2A, after a movement of a user or rider, where the length of the dashed line arrow is proportional to the distance measured by the sensor, where the increasing and/or decreasing distances measured by different sensors is used in determining tilt, lean, movement or rotation of a user, rider, or payload.

2.1 shows sensors, including remote sensing or electromagnetic wave based sensors, 2.2 shows measures of distance between a fixed point and a user or rider, in this case they are linear distances, distance is measured to all points or many points of the user or rider, dashed line shows distance to one point of user, rider, and/or payload, 2.3 shows a generic embodiment of the apparatus involving remote sensing and/or electromagnetic wave based sensing, 2.4 shows changing quantities of measures of distance measured by sensors, before and after a tilt, lean, movement and/or rotation of a user, rider, and/or payload, 2.5 shows a user, rider, and/or payload.

In a similar manner as consistent with present invention, the specific changing distance measurements 2.4 shown in FIG. 2 can be inputs to equations to determine tilt, lean, movement and/or rotation and/or change in tilt, lean, position and/or rotation. When a user, rider, and/or payload 2.5 tilts, the measured distances 2.3 between a fixed point and the user, rider, and/or payload 2.5 as determined by remote sensing and/or electromagnetic sensors 2.1 is used to determine a new tilt, lean, position and/or rotation of a user, rider, and/or payload. In a similar manner as above, likewise, an exact new tilt, position and/or center of mass is not required to be determined, but the quantities measuring the change in position, or relative change in position 2.4 may be passed to another control algorithm or mechanism on a vehicle or system employing the apparatus of the present invention.

Figure 3:
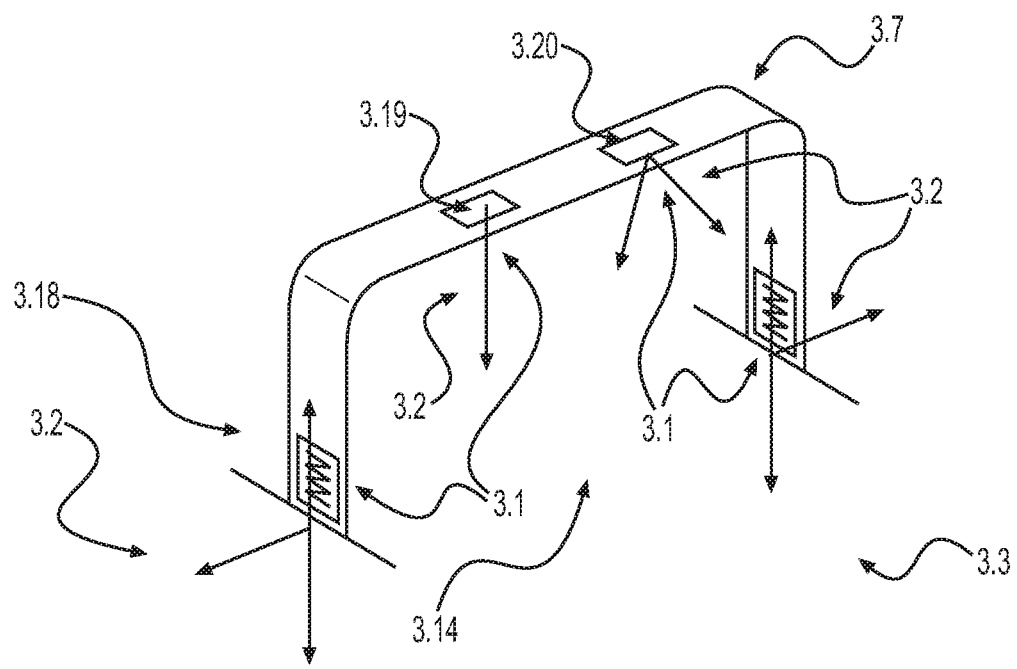
FIG. 3 shows a generic embodiment of a strap method of detecting tilt, lean, movement or rotation of a user, rider, or payload, including sensors tangential to a strap and sensors perpendicular or non-perpendicular to a strap.

FIG. 3 shows a generic embodiment of a strap method of detecting tilt, lean, movement or rotation of a user, rider, or payload, including sensors tangential to a strap and sensors perpendicular or non-perpendicular to a strap, where the forces or distances measured by the sensors may be considered changing in a manner as in FIG. 1, where the amount of force or distance or change in force or distance in sensors can be used to determine tilt, lean, movement or rotation of a user, rider, or payload.

3.1 shows sensors, including weight or force sensors, that may be tangential to or parallel with a strap type structure, or may be perpendicular to, or non-perpendicular to, a strap type apparatus, 3.2 shows measures of weight or force from sensors; user, rider, and/or payload tilt, lean, movement and/or rotation effects the strap type apparatus which is detected by the sensors; forces may be parallel 3.18 with a strap type structure, perpendicular 3.19 to a strap type structure and/or non-perpendicular or non-parallel 3.20 to a strap type structure, 3.3 shows a generic embodiment of a strap type structure embodiment of the present invention, 3.7 shows a strap type structure, 3.14 shows where a user, rider, and/or payload may be, 3.18 shows a sensor parallel to a strap type structure, which may be within the strap, or where a strap type structure joins or connects with another part of a structure of a system employing an embodiment of the present invention, 3.19 shows a sensor perpendicular to a strap type structure, 3.20 shows a sensor non-perpendicular to a strap type structure.

Figure 4:
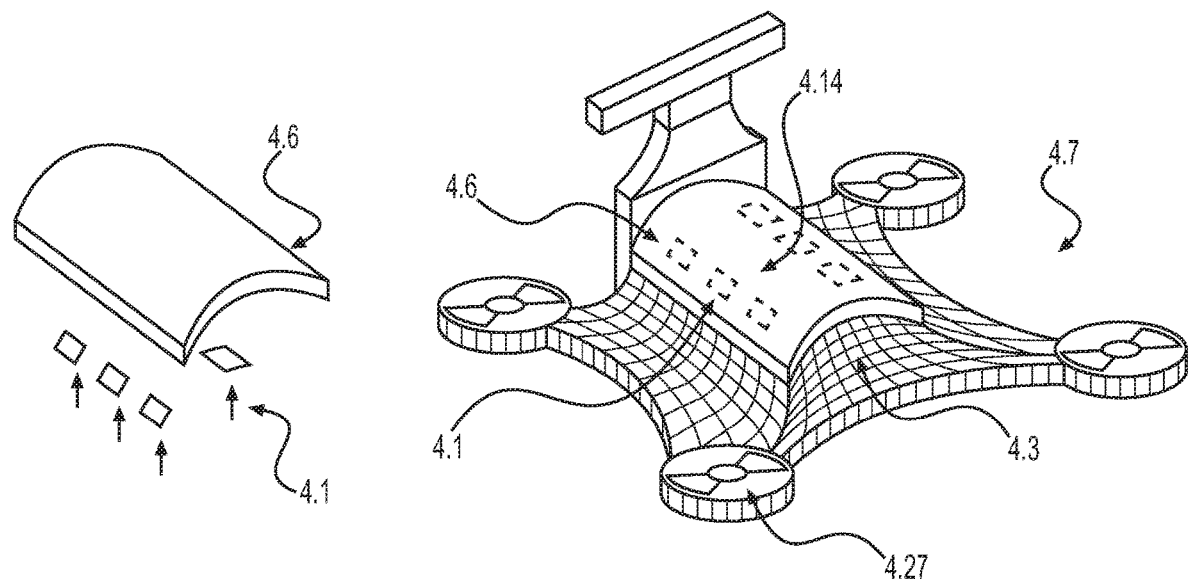
FIG. 4 an embodiment of a weight or force sensor apparatus of a tilt, lean, movement or rotation detector in the seat area of a personal flight vehicle.

FIG. 4 shows an embodiment of a weight or force sensor apparatus of a tilt, lean, movement or rotation detector in the seat area of a personal flight vehicle.

4.1 shows sensors, including weight or force sensors, 4.3 shows an embodiment of the invention within a sitting based personal flight vehicle, 4.6 shows a seat style embodiment of the present invention containing weight or force sensors, mounted on a flight vehicle, 4.7 shows personal flight vehicle, 4.14 shows where a user, rider, and/or payload may be, 4.27 shows a propulsive device, as in a propeller for example, as indicated in drawings, may be any propulsive or propulsion device.

Figure 5:
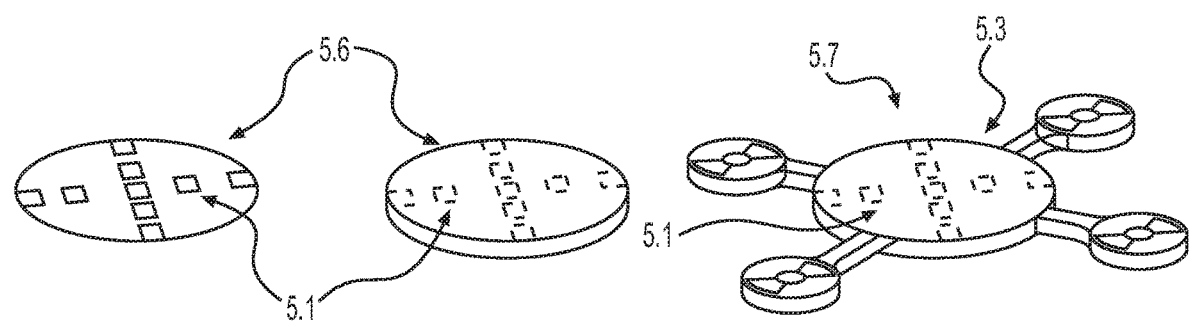
FIG. 5 an embodiment of a weight or force sensor apparatus of a tilt, lean, movement or rotation detector in a radial pattern on the standing platform as part of a standing personal flight vehicle.

FIG. 5 shows an embodiment of a weight or force sensor apparatus of a tilt, lean, movement or rotation detector in a radial pattern on the standing platform as part of a standing personal flight vehicle.

5.1 shows sensors, including weight or force sensors, 5.3 shows an embodiment of the invention within a standing or kneeling or other position flight vehicle, 5.6 shows a standing platform style embodiment of the present invention, with sensors in a radial pattern, where a set of sensors is embedded into a circular plane, and embedded into a standing platform, 5.7 shows a standing or sitting or kneeling or other position based flight vehicle.

FIG. 6 shows an embodiment of an electromagnetic wave based sensor apparatus of a tilt, lean, movement or rotation detector on a standing personal flight vehicle; it is highlighted in here that electromagnetic wave based sensors may detect versus many areas of a user rider, payload, by the dashed sensor sensing lines pointing to multiple areas of a user or rider.

6.1 shows sensors, including remote sensing or electromagnetic wave based sensors, 6.2 shows measurements taken from the sensors 6.1 to the user 6.5, here, multiple measurements are shown; typically sensors 6.1 take measurement to many points on the user 6.6, and may map an entire 3D representation of the user 6.5 in a virtual space as part of a computer framework as part of the apparatus or system which it may be a part of or used with, 6.3 shows an embodiment of the invention within a standing, potentially laterally oriented relative to the longer axis of the flight vehicle, flight vehicle, 6.5 shows a user, rider, and/or payload, 6.7 shows a standing or other position based flight vehicle.

FIG. 7A shows an embodiment of a strap method of detecting tilt, lean, movement or rotation of user, rider, or payload, where strap type structures may include tangential sensors as well as perpendicular or non-parallel sensors; this embodiment is of a user, rider, and/or payload on a horizontal type support structure, like a bed.

FIG. 7B is a zoomed in view of a portion of FIG. 7A, highlighting an extremity or payload strap type structure including a sensors, a force and/or weight structure, parallel with the strap type structure.

FIG. 7B is another zoomed in view of FIG. 7A, highlighting a torso or payload type strap configuration including sensors parallel to a strap type structure, perpendicular to a strap type structure, and non-perpendicular to a strap type structure.

7.1 shows sensors, including weight or force sensors, including sensors parallel to, perpendicular to, and non-perpendicular to a strap type structure 7.7, 7.3 shows an embodiment of the invention where a strap type structures with sensors are used, around, on or attached to a user, rider, and/or payload in a horizontally based, planar based and/or reclined based position, 7.5 shows a user, rider, and/or payload, 7.7 shows a strap type structure, including sensors, 7.13 shows a support structure that may be used for a rider and/or payload where the support structure may be soft, and enable the rider to be in a reclined or fully reclined or lying down position.

Figure 8:
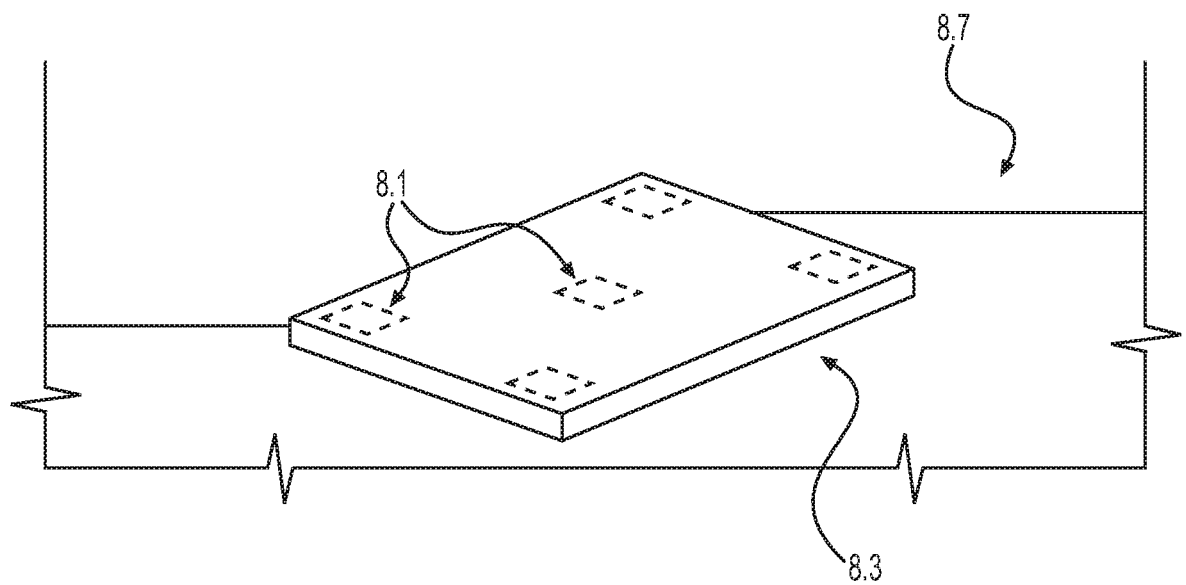
FIG. 8 a generic platform embodiment of a weight or force sensor based apparatus of the present invention situated on a ground in this embodiment.

FIG. 8 shows a generic platform embodiment of a weight or force sensor based apparatus of the present invention, this platform embodiment is situated on a ground in this embodiment, but may be placed on a vehicle, platform, or other within a system different than a ground.

8.1 shows sensors, including weight or force sensors, 8.3 shows an embodiment of the invention in a platform based format, where the platform is on a ground, or a flat or semi flat surface, which may be a floor, wall, curved wing type shape or otherwise, 8.7 shows a ground, a flat or semi flat surface.

Figure 9:
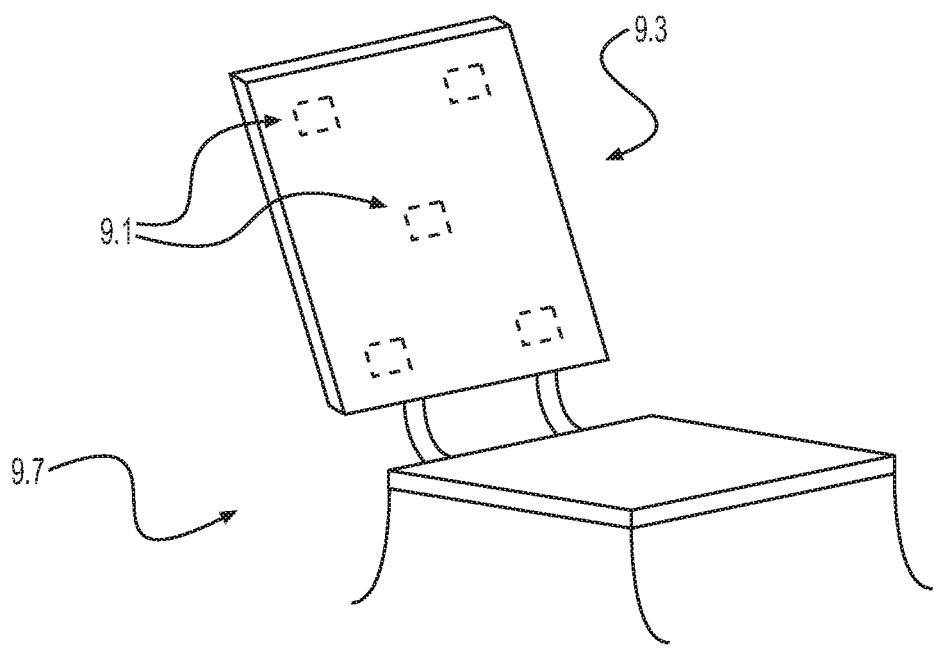
FIG. 9 shows an embodiment of the present invention comprising weight or force sensors on the seat-back portion of a generic chair or sitting device.

FIG. 9 shows an embodiment of the present invention comprising weight or force sensors on the seat-back portion of a generic chair or sitting device.

9.1 shows sensors, including weight or force sensors, 9.3 shows an embodiment of the present invention in the seat-back portion of a chair or seated structural support type of device, 9.7 shows a chair or seated structural support type of device.

Figure 10:
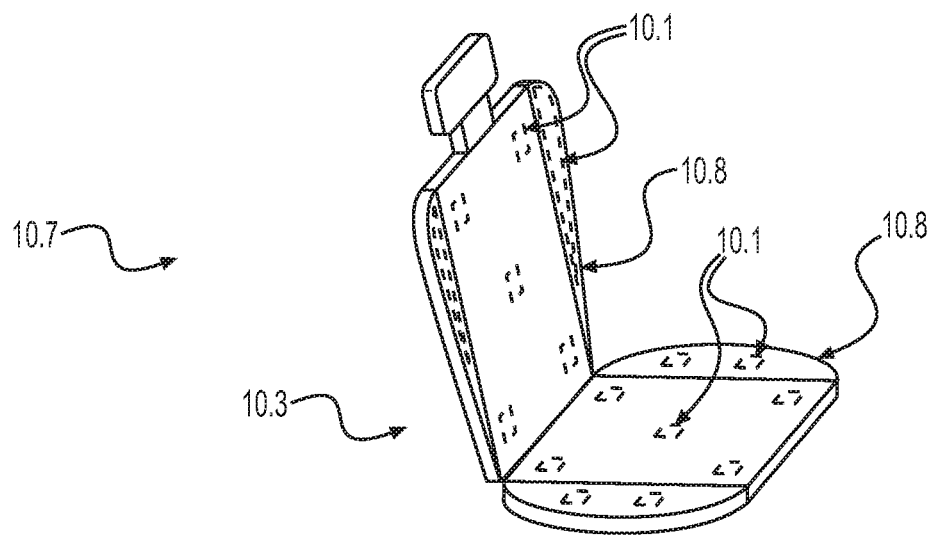
FIG. 10 shows an embodiment of the present invention employed in a chair, or a seated position, or semi-reclined, or reclined support type structure often used for riders or drivers of vehicles.

FIG. 10 shows a more detailed embodiment of the present invention employed in a chair, or a seated position, or semi-reclined, or reclined support type structure, where the chair is more typical of seated support structures often used for riders or drivers of vehicles; weight or force sensors in the main support areas of the structure, seat and seat-back, as well as side areas of the structure, pieces of the chair that may provide lateral or head support, are shown.

10.1 shows sensors, including weight or force sensors, 10.3 shows an embodiment of the present invention in a seat or seat-type structural support type of device, which may include lateral or side support type structures, where the chair may be in a reclined or semi reclined position, 10.7 shows a seat or seat-type structural support type of device, which may include lateral or side support type structures, where the chair may be in a reclined position, 10.8 shows lateral or side support type structures, which may include sensors.

Figure 11:
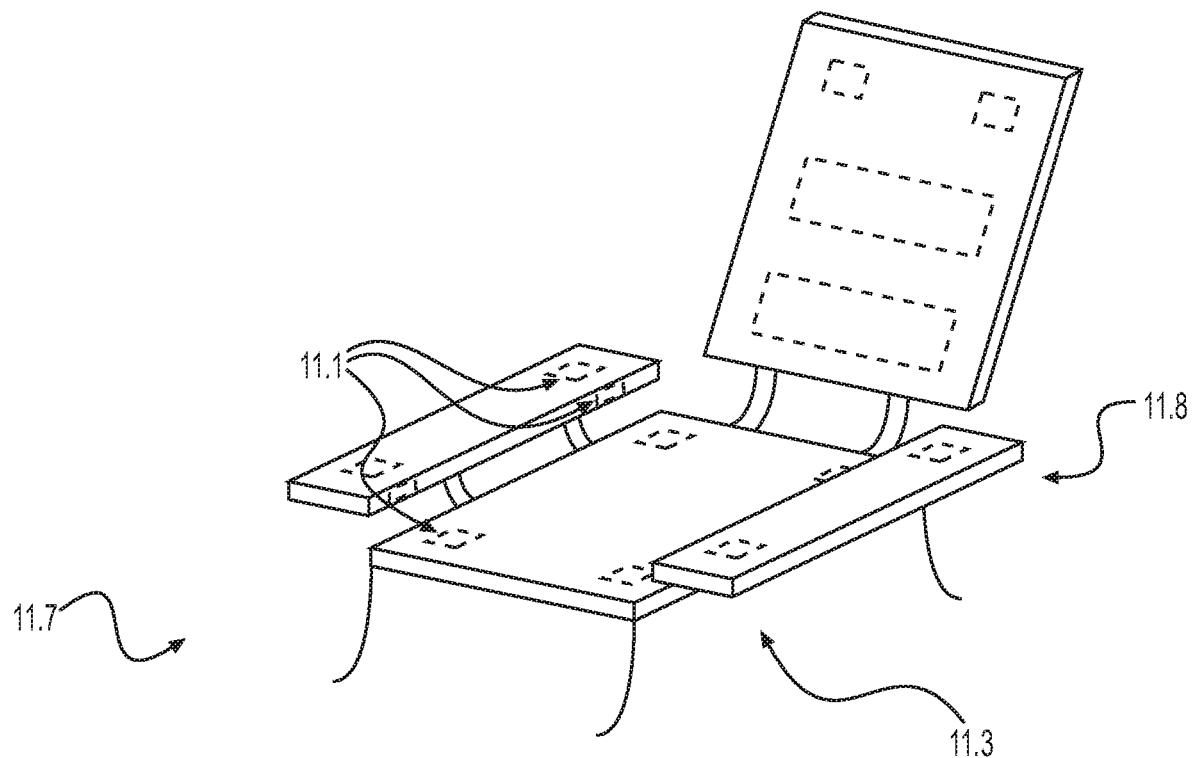
FIG. 11 shows an embodiment of the present invention where weight or force sensors are included in arm rests, on top of and on the inside, and in multiple areas, of the arm rests.

FIG. 11 shows an embodiment of the present invention where weight or force sensors are included in arm rests, on top of and on the inside, and in multiple areas, of the arm rests.

11.1 shows sensors, including weight or force sensors, including sensors inside the arm rests, facing where a user, rider, and/or payload may be stored, adjacent to and/or surrounding where user, rider, and/or payload may go, 11.3 shows an embodiment of the present invention in a seat or seated structural support type of device, which may include arm rests which may also act as lateral or side support type structures, where the chair may be in a reclined position, 11.7 shows a seat or seat-type structural support type of device, which may include arm rests which may also act as lateral or side support type structures, where the chair may be in a reclined or semi reclined position, 11.8 shows arm rests, where arm rests may also act as lateral or side support structures.

Figure 12:
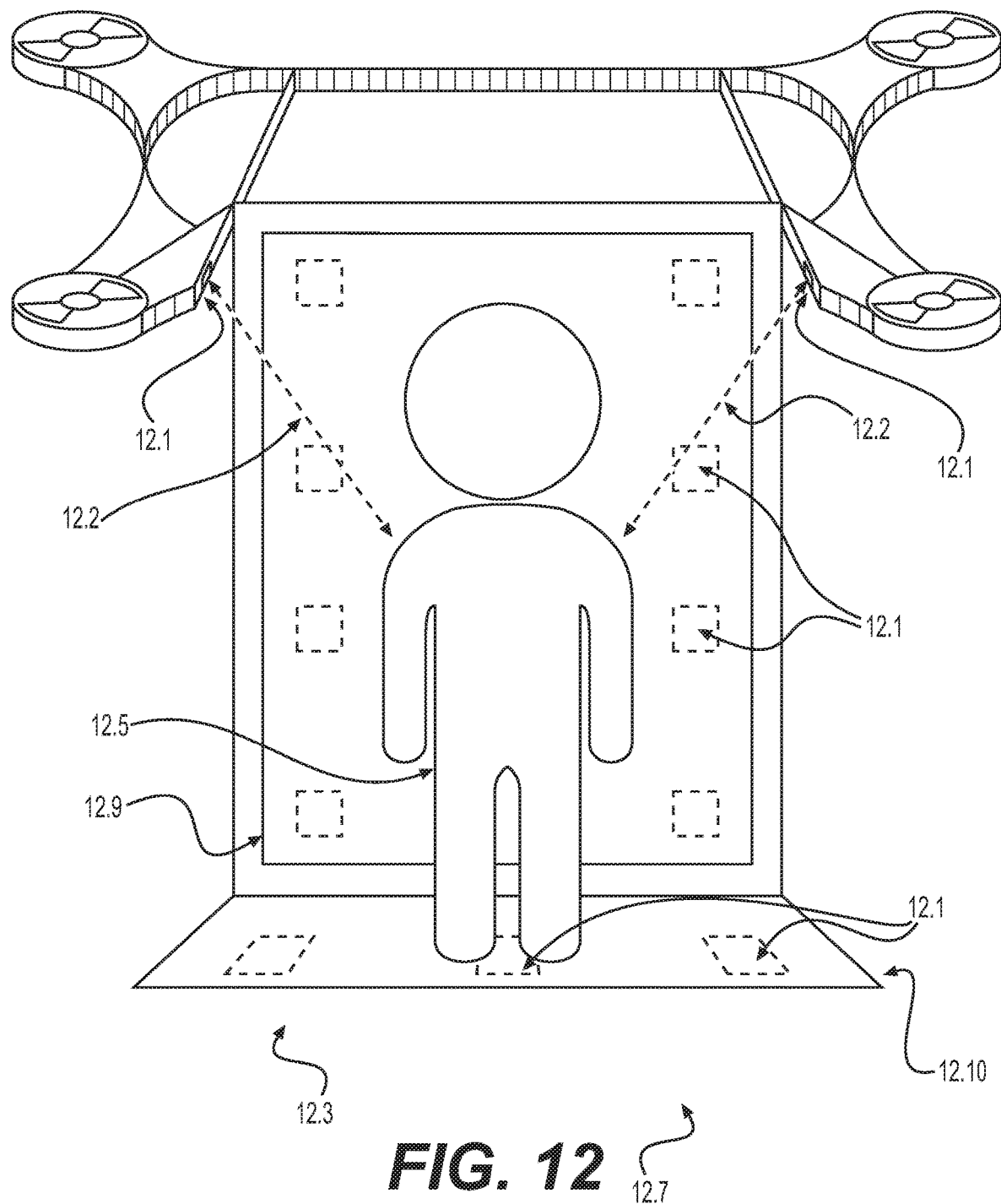
FIG. 12 shows the apparatus of the present invention employed with weight or force and electromagnetic based sensors employed on a personal flight vehicle of a flight suit or flying exoskeleton nature.

FIG. 12 shows the apparatus of the present invention employed with weight or force and electromagnetic based sensors employed on a personal flight vehicle of a flight suit or flying exoskeleton nature.

12.1 shows sensors, including weight or force sensors and remote sensing or electromagnetic wave based sensors, used at the same time, including in a side embodiment 12.9, on which a user, rider, and/or payload may lean, and a standing portion 12.10, on which a user, rider, and/or payload may stand, 12.2 shows distance measurements shown from remote sensing or electromagnetic wave based sensors to user, rider, and/or payload, only one point of measurement is shown with the dashed arrows, but distances to multiple points of the user are measured, and may map an entire 3D representation of the user, rider, and/or payload 12.5 in a virtual space as part of a computer framework as part of the apparatus or a system it is part of, 12.3 shows an embodiment of the present invention where the apparatus is used in a personal flight exoskeleton or personal flight suit type embodiment, 12.5 shows a user, rider, and/or payload; a user, rider, and/or payload may be taller than the example shown in 12.5 and may be taller than the exoskeleton device 12.7, 12.7 shows personal flight exoskeleton or flight suit type embodiment, 12.9 shows an embodiment of the present invention where the apparatus is set up in a position that is vertical, where a user, rider, and/or payload may lean into it, 12.10 shows an embodiment of the present invention where the apparatus is set up in a position that is horizontal, where a user, rider, and/or payload may stand on it, while also leaning against another part of a vehicle, where the vehicle is employing the apparatus of the present invention in one or more areas.

Figure 13:
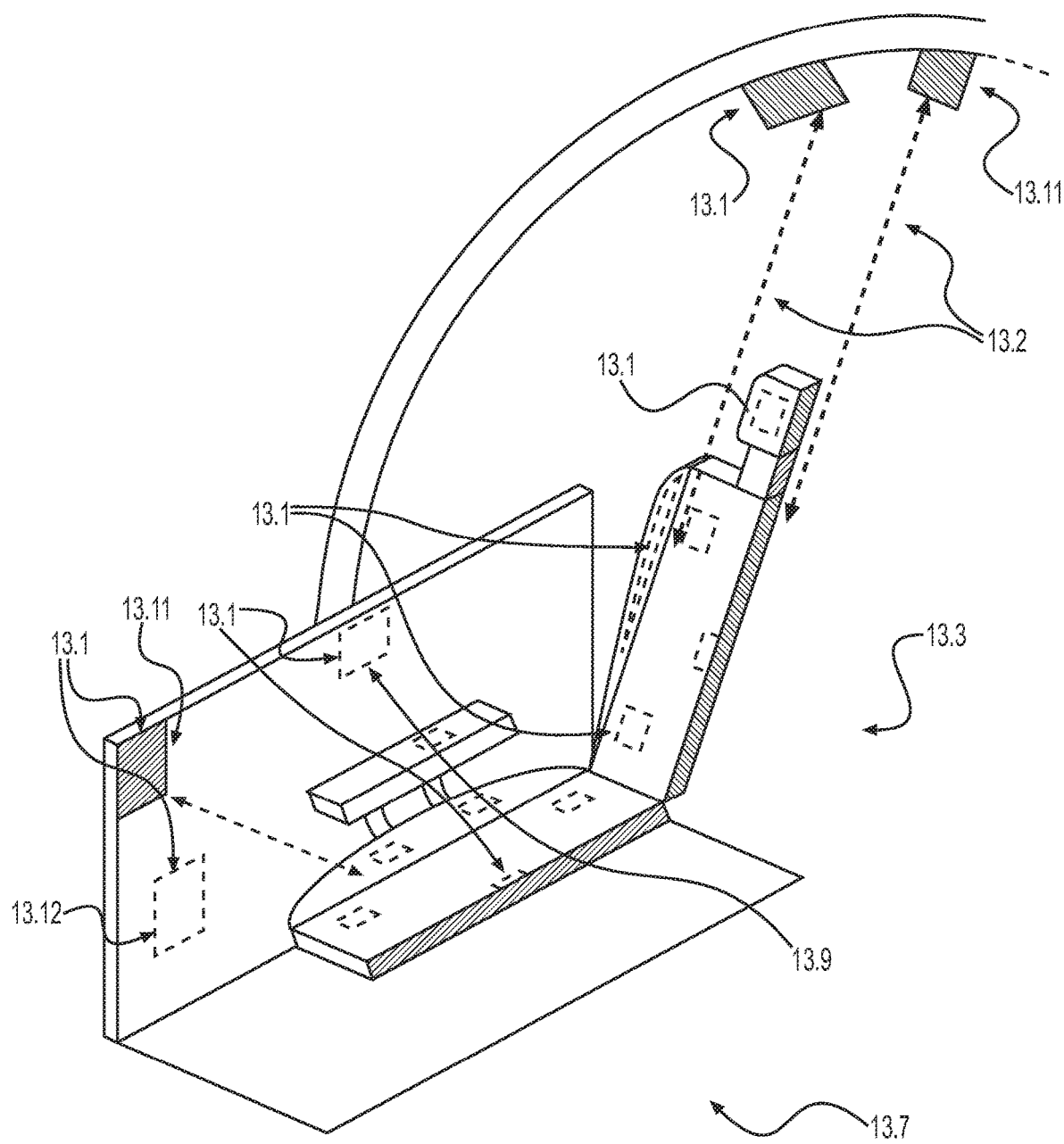
FIG. 13 shows the apparatus of the present invention employed with weight or force sensors, as well as electromagnetic sensors, in a chair similar to a cockpit, vehicle driver or rider chair.

FIG. 13 shows the apparatus of the present invention employed with weight or force sensors, as well as electromagnetic sensors, in a chair similar to a cockpit, vehicle driver or rider chair, where sensors are included around and above a user, rider, or payload, where a mechanical structure may be above a user rider or payload, where that may be open air with roll bars or a glass enclosure.

13.1 shows sensors, including weight or force sensors and remote sensing or electromagnetic wave based sensors, used at the same time, including side embodiments 13.9, into or on which a user, rider, and/or payload may lean, as well as adjacent and above remote sensing or electromagnetic wave based sensors 13.11 as well as foot well area sensors 13.12, 13.2 shows distance measurements shown from remote sensing or electromagnetic wave based sensors to the area where a user, rider, and/or payload may be, only one point of measurement is shown with the dashed arrows, but distances to multiple points of the user, rider, and/or payload may be measured, and may map an entire 3D representation of the area where a user, rider, or payload may be in a virtual space as part of a computer framework as part of the apparatus or system it is part of, 13.3 shows an embodiment of the present invention where the apparatus is employed within a cockpit like setting, where sensors, weight and/or force and/or remote sensing and/or electromagnetic wave based sensors are used, 13.7 shows a cockpit type environment, 13.9 shows side mounted sensors, 13.11 shows adjacent and/or peripheral and/or overhead sensors, 13.12 footwell area sensors.

FIG. 14 shows an embodiment of the apparatus of the present invention where the apparatus is employed in a bed-like, or horizontally based, support structure, where weight or force and electromagnetically based sensors are employed around a user, rider, or payload on a flight vehicle.

14.1 shows sensors, including weight or force sensors and remote sensing or electromagnetic wave based sensors, used at the same time, including adjacent and above remote sensing or electromagnetic wave based sensors, 14.2 shows distance measurements shown from remote sensing or electromagnetic wave based sensors to user, rider, and/or payload, only one point of measurement is shown with the dashed arrows, but distances to multiple points of the user are measured, and may map an entire 3D representation of the user 14.5 in a virtual space as part of a computer framework as part of the apparatus or system it is part of, 14.3 shows an embodiment of the present invention where the apparatus is employed in a flight vehicle where a user or rider may be transported in a horizontal, reclined, partially reclined or fully reclined position, 14.5 shows a user, rider, and/or payload, the rider in a horizontal, relined or semi recline position, and may be injured or non-injured, 14.7 shows a flight vehicle where a rider is reclined and may be injured or non-injured, 14.11 shows adjacent and/or peripheral and/or overhead sensors, where sensors may be elongated or more even rectangles or any shape, 14.13 shows a support structure that may be used for a rider where the support structure may be soft, and enable the rider to be in a reclined or fully reclined or lying down position.

FIG. 15A shows a generic 2D embodiment of a flexible mechanism implementation of the present invention, in a state tilted from FIG. 15A, where a flexible adjoinment mechanism is used with electromagnetic wave based distance sensors to determine the tilt, lean, movement or rotation of a structure of a vehicle or system where that structure is effected or impacted by a tilt, lean, movement and/or rotation of a user, rider, or payload, where the flexible mechanism may also determine amount and/or rate and/or degree of bend.

FIG. 15B shows a generic 2D embodiment of a flexible mechanism implementation of the present invention, where a flexible adjoinment mechanism is used with electromagnetic wave based distance sensors to determine the tilt, lean, movement or rotation of a structure of a vehicle or system where that structure is effected or impacted by a tilt, lean, movement and/or rotation of a user, rider, or payload, where the flexible mechanism may also determine amount and/or rate and/or degree of bend where sensors measure a different distance after a tilt, lean, movement or rotation, where the distance measured by the sensors is proportional to the dashed arrows shown, where the distance determined by the sensors is used to determine a tilt, lean, movement and/or rotation of a user, rider, or payload.

15.1 shows sensors, including weight or force sensors and remote sensing or electromagnetic wave based sensors, used potentially at the same time, including a flexible mechanical structure that bends and may senses a degree of bend and may detect the rate of bend, 15.2 shows distance measurements shown from remote sensing or electromagnetic wave based sensors to a structural part of a vehicle that is effected or impacted by a lean, tilt, movement and/or rotation of a user, rider, and/or payload, 15.3 shows a generic embodiment of the present invention, where a structural element is effected or impacted by a tilt, lean, movement and/or rotation of a user, rider, and/or payload, 15.4 shows changing quantities of measures of distance measured by sensors, before and a tilt, lean, movement and/or rotation of a user, rider, and/or payload, 15.7 shows a structural element that may be effected or impacted by a tilt, lean, movement and/or rotation of a user, rider, and/or payload, 15.14 shows location where a user, rider, and/or payload may be.

Figure 16A:
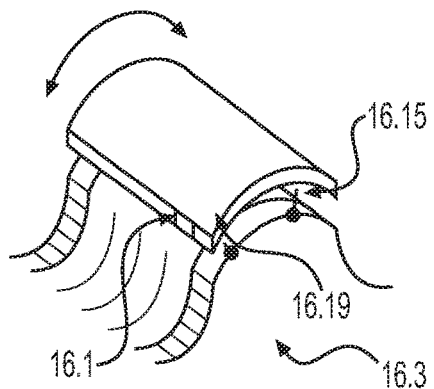
FIGS. 16A and 16B show a sliding platform embodiment of the present invention, in the form a bench-seat structure on a sliding device, where weight or force or distance may be measured.

FIG. 16 shows a sliding platform embodiment of the present invention, in the form a bench-seat structure on a sliding device, where weight or force or distance may be measured on the sliding device in order to determine tilt, lean, movement and/or rotation of a user, rider, or payload.

Figure 16B:
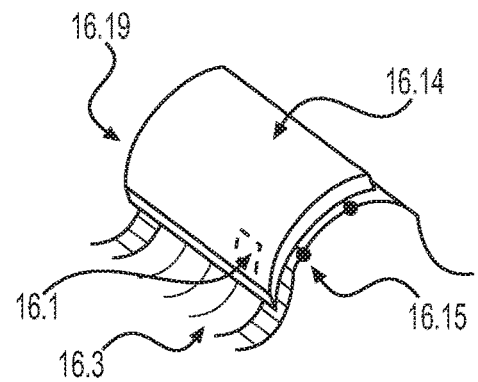

16.1 shows sensors, including remote sensing or electromagnetic wave based sensors, where the sensor is blocked from view in FIG. 16B, 16.3 shows an embodiment of the present invention where a sliding or lateral movement with optional rotational movement is used, 16.14 shows where a user, rider, and/or payload may go, 16.15 shows sliding mechanism allowing a structural aspect of the system that is effected or impacted by tilt, lean, movement and/or rotation of a user, rider, and/or payload to move relative to another part of the structure of the vehicle or system, 16.19 shows a structural aspect of the system that is effected or impacted by tilt, lean, movement and/or rotation of a user, rider, and/or payload to move relative to another part of the structure of the vehicle or system.

FIG. 17 shows a pivot-point based embodiment of the present invention, where a structure is able to tilt and/or rotate on a pivot capable adjoinment mechanism, where weight, force or distance of the pivotable support structure may be measured in order to determine a tilt, lean, movement and/or rotation of a user, rider, or payload, where rotation is shown before and after a tilt and/or rotation of a user, rider, or payload through the angle theta and theta prime, for the angle of orientation before and after a tilt, lean, movement and/or rotation.

Figure 17A:
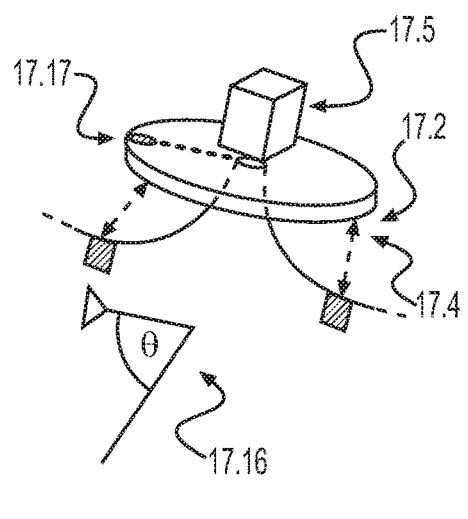
FIGS. 17A and 17B show a pivot-point based embodiment of the present invention, where a structure is able to tilt and/or rotate on a pivot capable adjoinment mechanism, where weight, force or distance of the pivotable support structure may be measured.
Figure 17B:
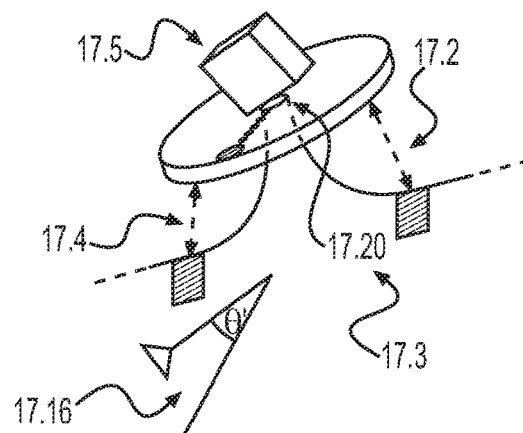

17.1 shows sensors, including remote sensing or electromagnetic wave based sensors, 17.2 shows measures of distance between a fixed point and a user or rider, in this case they are linear distances, distance is measured to all points or many points of the user or rider, dashed line shows distance to one point of user, rider, and/or payload, 17.3 shows pivot enabled embodiment, 17.4 shows changing quantities of measures of distance measured by sensors, before and after a tilt, lean, movement and/or rotation of a user, rider, and/or payload, 17.5 shows a payload, which may be a user, rider, and/or payload, 17.16 shows an angle theta and theta prime denoting the amount of rotation after a tilt, lean, movement and/or rotation, 17.17 highlights a point of reference on FIG. 17A and FIG. 17B to highlight rotation of a structural component of a vehicle as captured by angle 17.16, theta, 17.20 shows a pivot type of point or fulcrum type of structure or other structure from hard material like metal or flexible material like rubber, may be a hinge type mechanism, a floating mechanism that may involve magnets and/or ball joints, large surface areas upon large surface areas, or other methods allowing mobility.

Figure 18:
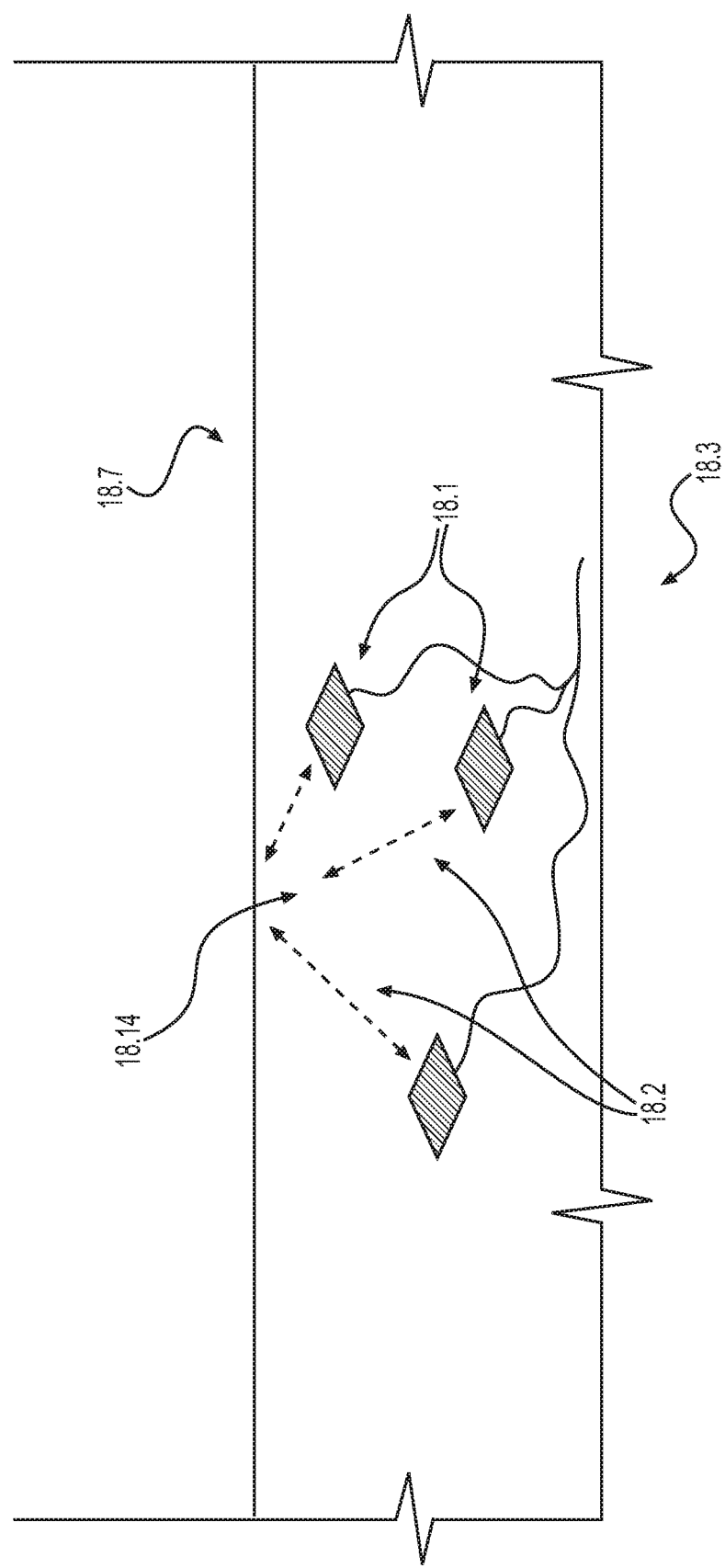
FIG. 18 shows an embodiment of the present invention where the apparatus consists of electromagnetic wave based sensors where the electromagnetic wave based sensors measure an area encompassed by the sensors.

FIG. 18 shows an embodiment of the present invention where the apparatus consists of electromagnetic wave based sensors where the electromagnetic wave based sensors measure an area encompassed by the sensors, where if a user or payload was within that area, the sensors would be determine tilt, lean, movement or rotation of a user or payload; in this embodiment, the sensors are on a ground; an apparatus as shown would also function in a non-horizontal orientation, on a wall or ceiling for example, or on a vehicle, or in combination with weight or force of strap of other sensors.

18.1 shows sensors, including remote sensing or electromagnetic wave based sensors, 18.2 shows distance measurements shown from remote sensing or electromagnetic wave based sensors to the area where a user, rider, and/or payload may be, only one point of measurement is shown with the dashed arrows, but distances to multiple points of the user, rider, and/or payload may be measured, and may map an entire 3D representation of the area where a user, rider, or payload may be in a virtual space as part of a computer framework as part of the apparatus or the system it is part of, 18.3 shows an embodiment of the invention in a remote sensing, and/or electromagnet based sensors attached to a ground or surface or flat or somewhat flat surface, format, 18.7 shows a ground, a flat or semi flat surface, 18.14 shows a location where a user, rider, and/or payload may be.

FIG. 19 shows an apparatus for an embodiment of the present invention comprising a slide and pivot-rotate mechanism, where a structural element is able to pivot, rotate and/or slide, and weight, force and/or distance may be measured, on that slide, rotate and/or pivot, which may be used to determine a tilt, lean, movement or rotation; a structural element with these capabilities is shown above and then on a fulcrum type of structure, one of multiple methods enabling these capabilities.

19.1 shows sensors, including weight or force sensors and remote sensing or electromagnetic wave based sensors, potentially used at the same time; sensors may also include accelerometers or other movement based sensors, 19.2 shows distance measurements shown from remote sensing or electromagnetic wave based sensors to a structural part of a vehicle that is effected or impacted by a lean, tilt, movement and/or rotation of a user, rider, and/or payload, 19.3 shows an embodiment of the present invention, where a structural element is effected or impacted by a tilt, lean, movement and/or rotation of a user, rider, and/or payload such that this is detected by sensors as described in the invention, where this format of the present invention is employed in a flight type vehicle, 19.5 shows where a user, rider, and/or payload may be, 19.7 shows a flight vehicle type device, 19.19 shows a structural aspect of the system that may be effected or impacted by tilt, lean, movement and/or rotation of a user, rider, and/or payload to move relative to another part of the structure of the vehicle or system, 19.20 shows a pivot type of point or fulcrum type of structure or other structure from hard material like metal or flexible material like rubber, may be a hinge type mechanism, a floating mechanism that may involve magnets and/or ball joints, large surface areas upon large surface areas, or other methods allowing mobility.

Figure 20:
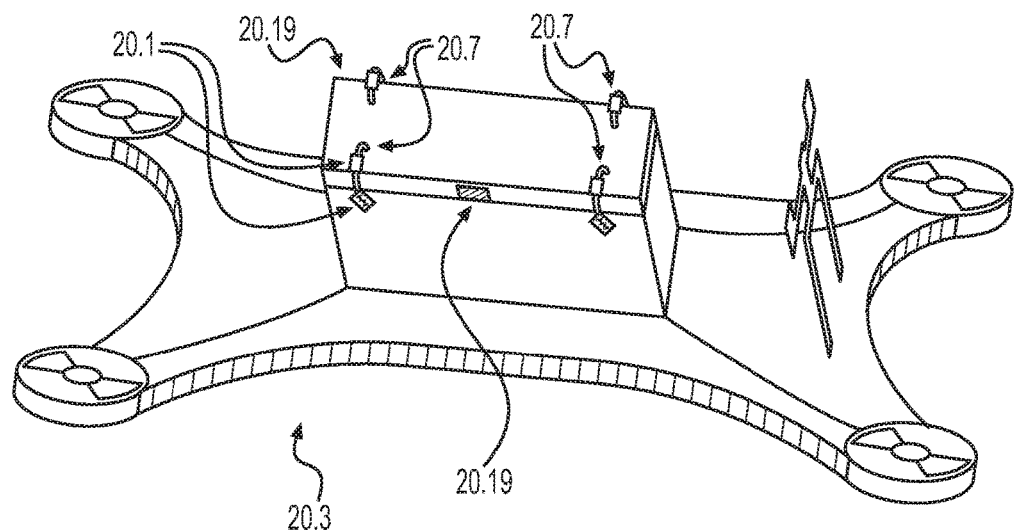
FIG. 20 shows an embodiment of the present invention, where a structural element is effected or impacted by a tilt, lean, movement and/or rotation of a user, rider, and/or payload.

FIG. 20 shows an embodiment of the present invention, where a structural element is effected or impacted by a tilt, lean, movement and/or rotation of a user, rider, and/or payload such that this is detected by sensors as described in the invention, where this format of the present invention is employed in a flight type vehicle.

20.1 shows sensors, including weight or force sensors and remote sensing or electromagnetic wave based sensors, potentially used at the same time, 20.3 shows an embodiment of the present invention including a structural aspect of the system that may be effected or impacted by tilt, lean, movement and/or rotation of a user, rider, and/or payload to move relative to another part of the structure of the vehicle or system, where the present invention is on a flight vehicle, 20.7 shows a strap type structure, including sensors, 20.19 shows a structural aspect of the system that is effected or impacted by tilt, lean, movement and/or rotation of a user, rider, and/or payload to move relative to another part of the structure of the vehicle or system.

Figure 21:
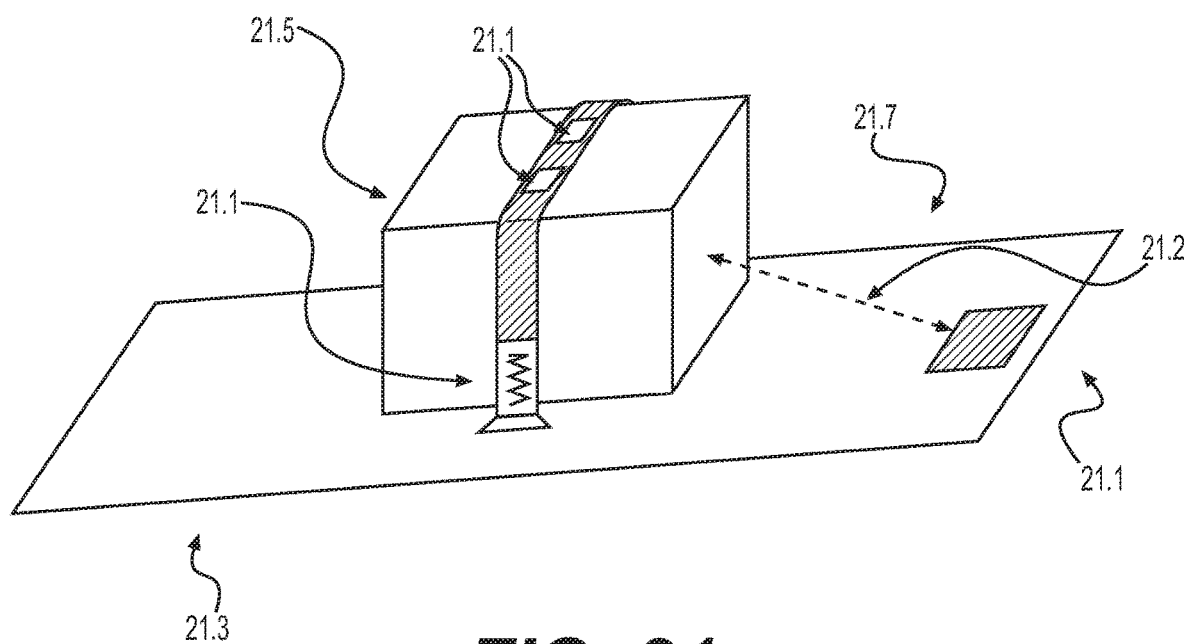
FIG. 21 shows an embodiment of the invention where a strap type structure and a remote and/or electromagnetic wave type sensor are used.

FIG. 21 shows an embodiment of the invention where a strap type structure and a remote and/or electromagnetic wave type sensor are used, where these sensors are implemented on a generic platform or flat or non-flat structure which may be part of another structure, vehicle, or system.

21.1 shows sensors, including weight or force sensors and remote sensing or electromagnetic wave based sensors, potentially used at the same time, 21.2 shows measures of distance between a fixed point and a user or rider, in this case they are linear distances, distance is measured to all points or many points of the user or rider, dashed line shows distance to one point of user, rider, and/or payload, 21.3 shows a generic strap type structure and remote sensing type sensor embodiment of the present invention, 21.5 shows a user, rider, and/or payload, 21.7 shows a planar surface that an embodiment of the present invention is on, it may be a curved surface or another surface.

Figure 22:
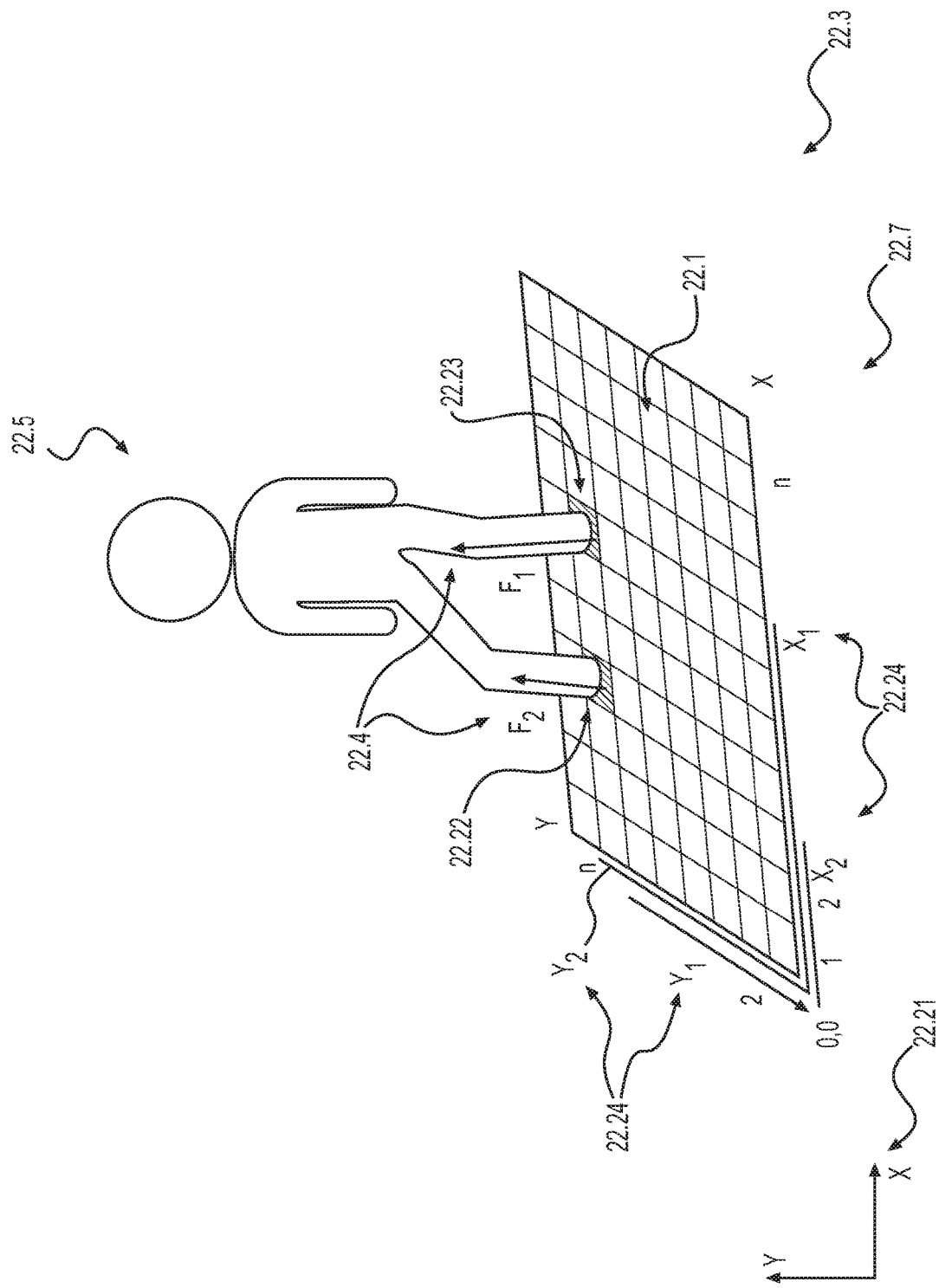
FIG. 22 shows a user, rider, and/or payload on a generic embodiment of the present invention employing weight or force type sensors, where force magnitudes, distances, a coordinate system and a count of 1 to n sensors are indicated, as well as x and y labeled axis of a coordinate system.

FIG. 22 shows a user, rider, and/or payload on a generic embodiment of the present invention employing weight or force type sensors, where force magnitudes, distances, a coordinate system and a count of 1 to n sensors are indicated, as well as x and y labeled axis of a coordinate system imposed on an embodiment of the present invention to highlight a method of calculation of movement and/or center of mass.

22.1 shows sensors, including weight or force sensors, in a grid type format, ranging from 0 through n across the platform, where each grid cell is a sensor, 22.7 shows a planar surface embodiment of the present invention, 22.3 shows a generic grid or patterned placement of sensors to cover a surface where a user, rider, or payload may be, embodiment of the present invention, 22.4 shows the changing quantities of force measured by sensors, before, during and after a tilt, lean, movement and/or rotation of a user, rider, and/or payload, 22.5 shows a user, rider, and/or payload, 22.7 shows a planar surface encompassing sensors, 22.21 shows a coordinate system, 22.22 shows sensors detecting something from a user, rider, and/or payload, sensing F2; 22.23 shows sensors detecting something from a user, rider, and/or payload, sensing F1; 22.24 shows coordinates of current points of contact of user, rider, and/or payload with apparatus.

To elaborate, in FIG. 22, a generic embodiment of the present invention where weight or force type sensors are oriented in a grid based configuration, in a general planar or platform based embodiment of the present invention, where an arbitrary reference coordinate frame X, Y 22.21 has been included, and an example user, rider, and/or payload is present on the generic platform based embodiment of the present invention, the weight or force as detected by the sensors 22.22, combined with the weight or force detected by sensors 22.23 may be combined using distances x1, y1 and x2, y2 22.24, in order to determine a center of mass of the user, ride and/or payload, noting that the is relative to the coordinate system in use. Specifically, a center of mass in FIG. 22 may be determined by finding the weighted sum of the location x1, y1 and x2, y2 22.24, where the weighting is relative to the forces F1 and F2 22.4, where in this case it may be estimated by $$x\text{-coordinate center of mass} = F1*x1 + F2*x2/(F1+F2)$$

$$y\text{-coordinate center of mass} = F1*y1 + F2*y2/(F1+F2)$$

if the user, rider, and/or payload then moved, at a time t+n where n is a time in the future relative to t, where t is an arbitrary initial time, then a new center of mass may be found, where $$x'\text{-coordinate center of mass} = F1'*x1' + F2'*x2'/(F1' + F2')$$

$y'$-coordinate center of mass=$F1'*y1'+F2'*y2'/(F1'+F2')$ it is the case that the exact location of the center of mass at time t and t+n is an output of the present invention; it is also the case that the change in center of mass is an output of the present invention; it is also the case that the x and y coordinates, as well F1 and F2 22.4, in either or magnitude and direction, may be an output and/or the only output of the present invention.

It is to be noted that were the planar example of FIG. 22 on a curved surface, more complex equations may be used, and equations including imaginary numbers, trigonometric functions, other complex functions, and any derivative functions, as well as constants, inputs based on environmental or other factors, or combinations of other algorithms, may be employed within the scope of the present invention, in this or any other configuration of the present invention.

Figure 23:
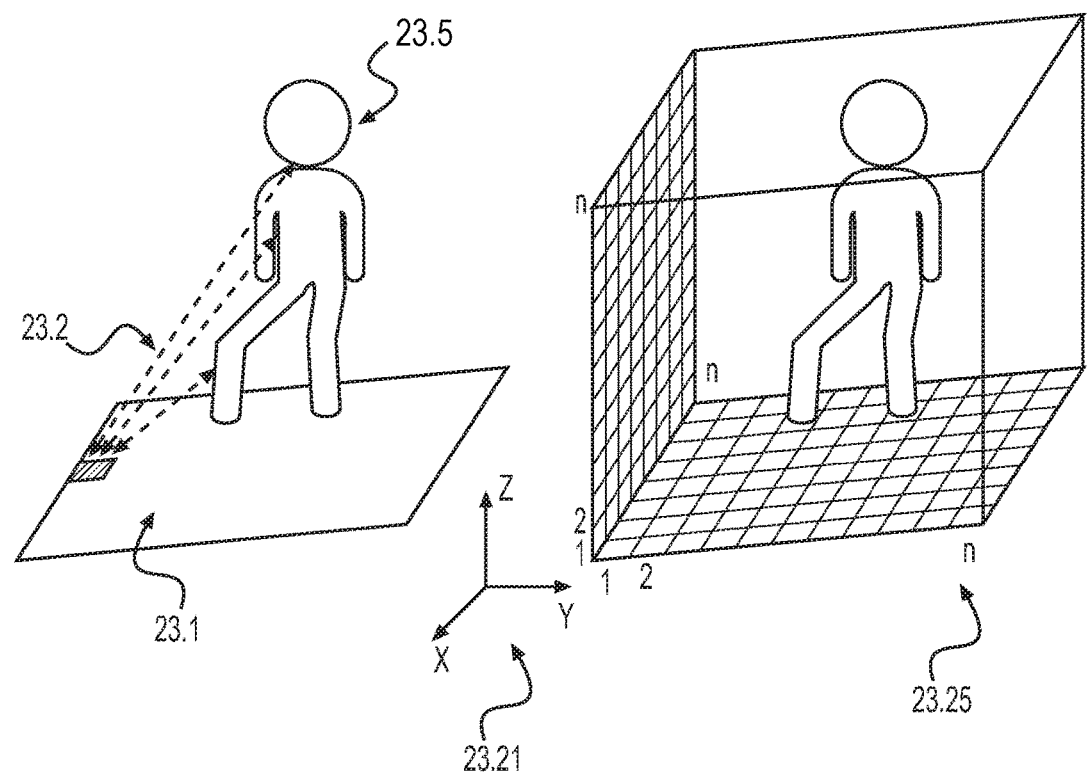
FIG. 23 shows a generic platform type embodiment, where a remote sensing or electromagnetic wave type sensor is used, where a potential 3D mapping that may be created within a computing environment is shown, including a coordinate system.

FIG. 23 shows a generic platform type embodiment, where a remote sensing or electromagnetic wave type sensor is used, where a potential 3D mapping that may be created within a computing environment is shown, including a coordinate system, to highlight the precise measurements that may be taken by the present invention, and used in determining tilt, lean, movement, rotation, change in tilt, lean, position and/or rotation, and/or center of mass and/or change in center of mass.

23.1 shows sensors, including remote sensing or electromagnetic wave based sensors, 23.2 shows measures of distance between a fixed point and a user or rider, in this case they are linear distances, distance is measured to all points or many points of the user or rider, dashed line shows distance to one point of user, rider, and/or payload, 23.5 shows a user, rider, and/or payload, 23.21 shows a coordinate system, 23.25 shows a 3D mapping of a user, rider, and/or payload that may be employed by the present invention, within which any of position, volume, surfaces, area, density, movement or other metrics may be modelled, estimated, measured, determined and/or output.

To elaborate, an embodiment of the present invention, encompassing a remote sensing or electromagnetic wave based sensors 23.1, where a sensor measures distances to a user, rider, and/or payload, and/or is able to detect density, a 3D map 23.25 of a user, rider, and/or payload may be created within a computing environment, and within this computing environment, based off of detection from the sensor, a lean, tilt, movement and/or rotation of a user, rider, and/or payload, may be detected. In the example of FIG. 23, if the sensor 23.1 detects the position of all of a user, rider, and/or payload, it would have the coordinates of each part of a user, rider, and/or payload—and if at a time t+n, as described above and with respect to typical continuous and/or per time analysis, the coordinates of a user, rider, and/or payload changed, then a tilt, lean, movement, and/or rotation of a user, rider, and/or payload would thus be determined.

Furthermore, through possibly a volume based estimation of a user, for example integrating over the measured points, to estimate a surface of a user, rider, and/or payload and determine a volume, if that surface of shape of a user, rider, and/or payload changed, a tilt, lean, movement, and/or rotation of a user, rider, and/or payload would thus be determined.

Furthermore, if a weight or force of a user was also determined by a sensor or otherwise know or input, then a center of mass could be determined through the present invention using the position and/or location based information of a user, rider, and/or payload as described above.

Furthermore, if a density sensing remote sensor was used, it could detect the density of a user, rider, and/or payload, and could thusly also determine a tilt, lean, movement and/or rotation of a user, rider, and/or payload in the same manner as described above, or could determine a center of mass or change in center of mass by using a 3D density map of a space where all, part, some, or none of a user, rider, and/or payload may be, by potentially integrating over the density map, or otherwise using the density information.

In these and other examples of the present invention, position, change in position, volume, surfaces or changes in volume of surfaces or measurements related to any of the above, may be an, or the only, output of an embodiment of the present invention, such that a full 3D map is not created, where only a plurality of distance detections or changes are output, or other metrics are outputs.

Figure 24:
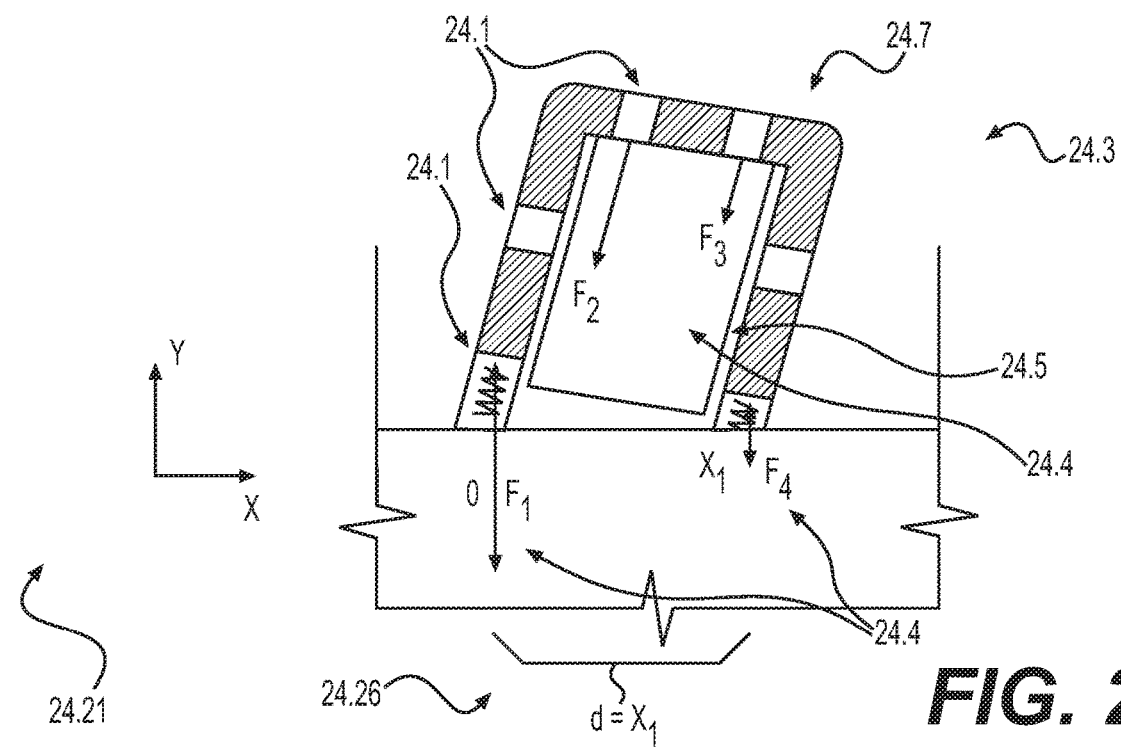
FIG. 24 shows a generic strap type structure embodiment of the present invention, where forces are shown of a user, rider, and/or payload on a strap type structure.

FIG. 24 shows a generic strap type structure embodiment of the present invention, where forces are shown of a user, rider, and/or payload on a strap type structure, the sensors or associates with a strap type structure, to highlight precise methods of determining and/or detecting tilt, lean, movement, rotation, change in tilt, lean, position and/or rotation, and/or center of mass and/or change in center of mass.

24.1 shows sensors, including weight or force sensors, 24.3 shows a strap type structure embodiment of the present invention, 24.4 shows the changing quantities of force measured by sensors, before, during and after a tilt, lean, movement and/or rotation of a user, rider, and/or payload, 24.5 shows user, rider, and/or payload, 24.7 shows a strap type structure, 24.21 shows coordinate system, 24.26 shows a distance d, a characteristic or piece of information about the embodiment, a distance between ends of a strap type embodiment; may be other metrics about the system.

Furthermore, as another example, as in FIG. 24, in an embodiment using a strap type structure 24.7, if a user, rider, and/or payload 24.5 tilts, leans and/or rotates, a strap based method may be able to determine a tilt, lean and/or rotation, based on the magnitudes and/or directions of strain, weight and/or force on sensors as in for example F1 and F2 24.4, and may include additional measurements or detections, F2, F3 24.4 for example, and may include various apparatus dimensions or characteristics or other information such as distance between ends of a strap based embodiment 24.26, where distance may be based on an imposed coordinate system 24.21.

Other metrics about the system may be known to an algorithm that is part of the system, including distances, weights, measurements of positions regarding size of platforms, structures, sensor position, as well as average weight, size, dimensions or other metrics of potential users, riders and/or payloads.

It is to be noted that if any of the above were implemented on curved surfaces, or in different configurations, different mathematical methods may be employed to determine a tilt, lean, movement, rotation and/or change in tilt, lean, position and/or rotation and/or center of mass and/or change in center of mass of a user, rider, and/or payload.

Embodiments of the present invention may be used well with flight vehicles and/or machines in air or otherwise, land vehicle and/or machines, water vehicles and/or machines, outer space vehicles and/or machines, where outer space or space refers to above Earth's atmosphere.

Embodiments of the present invention may not directly employ sensors, but detect relevant user, rider, and/or payload tilt, lean, movement and/or rotation information, and as described above, pass, as an output of the present invention, that information denoting the tilt, lean, movement, rotation and/or change in tilt, lean, position and/or rotation and/or center of mass and/or change in center of mass to another control algorithm or mechanism on a vehicle or system employing the apparatus of the present invention.

Embodiments of an apparatus of the present invention may involve anticipating, estimating, calculating and/or determining an anticipated and/or expected tilt, lean, movement, rotation and/or change in tilt, lean, position and/or rotation, and/or center of mass and/or change in center of mass—and may do so using any of the above methods, combined with previous movement, time series analysis, derivatives of motion analysis, as well as other sensors or methods, including but not limited to verbal commands, eye and/or gave tracking methods, movement tracking methods of specific body parts (head, arm, hands for example), and/or other methodologies. These calculations, or metrics and/or other information about anticipated movement may be passed, as outputs or the only outputs, of the present invention.

Embodiments of the present invention may use one or a plurality of sensors, placed in any of multiple locations, to measure one or plurality of parameters, where any combination of any sets of sensors, locations of sensors, directly detectable or measurable parameters or tangentially detectable or measurable parameters, based on a user, rider, or payload, or a portion of an apparatus effected by a user rider or payload, may be used to ascertain a shift, tilt, perturbation, rotation, slide or otherwise delta in position, or change in any of the these—and may be used in ascertaining a center of mass, center of gravity or otherwise center, or change thereof, of a payload, user and/or rider, and may be included in or used to inform a center of mass, center of gravity or otherwise center, determination, of whole payload, user, rider, vehicle system.

Additionally, a payload which may shift may encompass cargo, packages, a user or rider, liquid in a single container or multiple containers, single or multiple items attached to or tied down within a payload carrying area or not tied down and simply tossed into, or set upon or resting upon a surface within or on a payload support area. Liquids may include water, oil, flame retardant, fertilizer, pesticides, or other more or less viscous liquids, and may be in any containers that are standard containers, or include structures designed to minimize liquid shift or measure or detect liquid shift or address a shifting liquid, center of mass or center of gravity or position of liquid or any part of liquid in any part of a container or on a vehicle or structure employing the present invention. Packages may include any type of cargo, containers, boxes, canisters, cans, or non-boxed items including liquid canisters, shovels, ropes, medical supplies, ammunition, computers, robots, barricade material, wood, barbed wire, batteries, or any other object.

Any combination of any of the sensors described below, or any other sensors, may be combined in any manner to accomplish an embodiment of the present invention.

Sensors may include any combination of any of, weight sensors force sensors, tension sensors, stress sensors, stretch sensors, gyroscopes, accelerometers, sensors that detect acceleration or sudden changes in movement, spring, pivot joint, grid of sensors as described in sensors, plurality of sensors in multiple non-grid locations, polar coordinate based sensors, non-equally spaced sensors, equally or geometrically places sensors, hinge, rotation system, other mechanical sensors, cameras, image sensors, radar, lidar, sensors that determine weight or density of material, x-ray type sensors, magnetometers, accelerometers, springs, hydraulics or other mechanical components, sliding bases mechanisms, where a portion of a seat or another part of an apparatus as described within is able to slide and/or rotate, sliding or flexing components, part of a seat, seat back, standing platform can slide in a direction, or flex in a direction, mechanical sensors such as a rod where the amount of the extension of the rod is measured or the weight or force that the rod experienced is measured, a piece of an apparatus may be a seatback, seat, arm rests, or a structure that support a user, rider, or payload and that structure is something a person can lean against or stand on, and that may tilts.

Sensors may accomplish measurement through parameters such as any combination of any of weight, force, distance, length, position, 3d mapping and inferred or calculated position, orientation, tension, distance, electromagnetic waves or electromagnetic wave strength, strain, weight, may be detected, measured, ascertained or otherwise determined.

Sensing may occur or sensors may be in any locations or from any combination of locations such as beneath where a user rider or payload rests, on or in a platform, may be planar or a generic platform, on a curved or non-flat surface, on or in a structure, on or in a strap, on or in a seat, on or in a seatback, on or in a seating area, on or in an armrest, on or in footwells or vertical surfaces, built into on or in walls, on or in a standing platform, built into a cabin, built into a cockpit type area, built into, under or along with a seat or mechanical area or element that supports user, rider, and/or payload from the bottom, side or another area or direction, embedded in the body of a vehicle, sensors may be near to a payload or user/rider passenger area, may be beside a payload, user or rider area.

In embodiments, any combination of any of the above described sensors, or any other sensors, may be used on any area such as a vehicle, platform, wing, hanging support structure, vertically mounts on flight vehicle, flight exoskeleton suit, non-fixed portion of vehicle that can move in tilt/lean/rotation relative to the flight vehicle, road vehicle, water vehicle, structure, or ground.

In embodiments, any combination of any of the above or below described sensors, or any other sensors, may determine any of weight change, distance change, amount/magnitude, location, position, relative position, tilt, lean, rotation, movement, tilt, flex, bending of a piece of the apparatus this piece of hardware, or other relevant parameters that accomplish informing center of mass or center of gravity or position or change thereof of a user, rider, or payload.

In embodiments, sensors may detect anything in the event of if a change is detected, on a continuous control loop, every second or millisecond, other time intervals, update if there is a new measurement, updated it a measurement above a certain threshold occurs.

In embodiments, any combination of any of the above may be used to inform or calculate center of mass, change in center of mass, coordinates of center of mass, center of gravity, change in center of gravity, coordinates of center of gravity, tilt/lean/rotation/movement/position/change-there-of payload, user or rider, tilt/lean/rotation/movement/position/change-there-of center of mass or center of gravity of payload, user or rider, input tilt into control algorithms.

In embodiments, any output of any combination of any of the above may be used to as inputs to other systems including, direct input to another control system and/or algorithm, amount of shift etc., may not be calculated, but specific measurements may be passed to rest of system, may be inputs to equations that determine center of mass, may determine center of mass and pass this info to rest of system, quantities measuring a change or relative change or magnitude/direction may be passed to another control algorithm or mechanism.

Additional methods and sets of organizing sensors may be used, as described within, and other methods not expressly described within may accomplish the similar functionality, and rely on the principles and covered as a subset of the apparatus described within.

Figure 25:
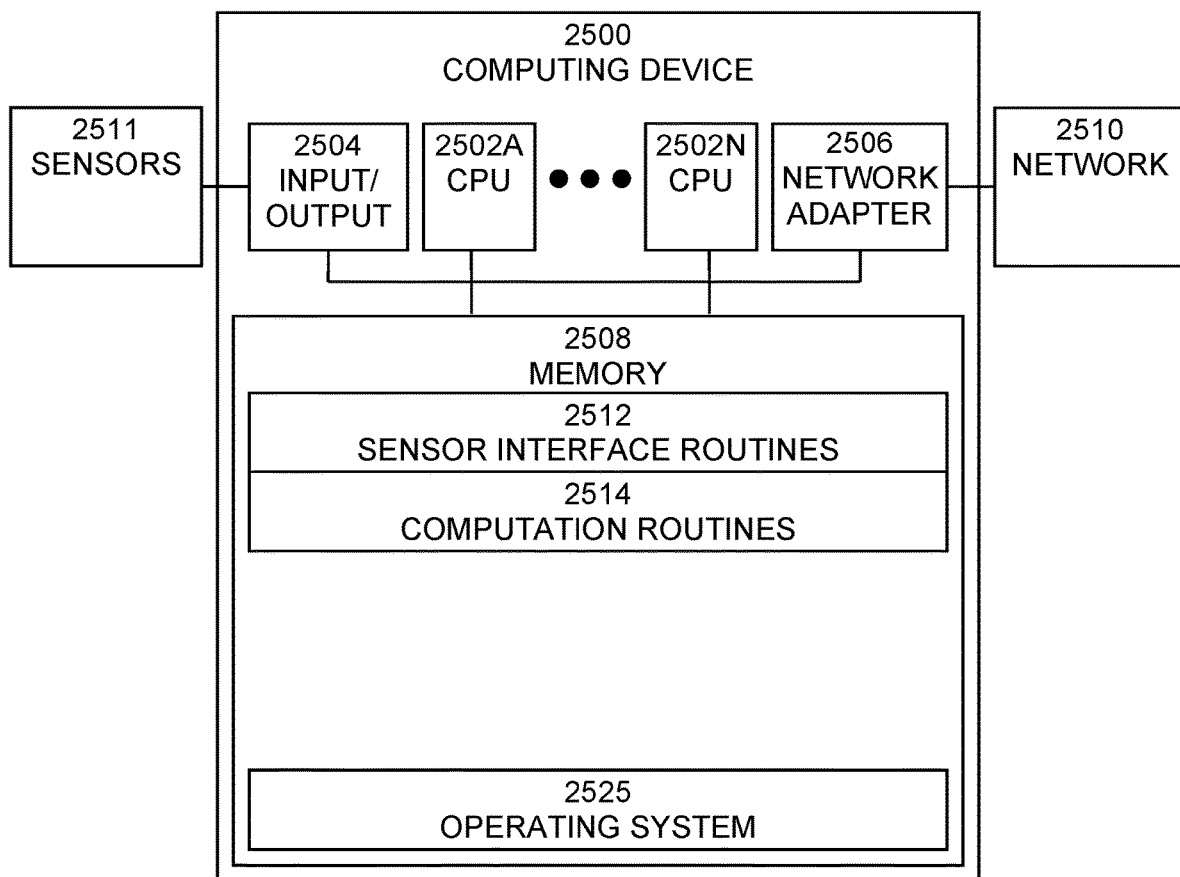
FIG. 25 shows an exemplary block diagram of a computing device in according to embodiments of the present invention.

An exemplary block diagram of a computational device, such as a computer system 2500, in which processes involved in the embodiments described herein may be implemented, is shown in FIG. 25. Computer system 2500 may be implemented using one or more programmed general-purpose computer systems, such as embedded processors, systems on a chip, personal computers, workstations, server systems, and minicomputers or mainframe computers, or in distributed, networked computing environments. Computer system 2500 may include one or more processors (CPUs) 2502A-2502N, input/output circuitry 2504, network adapter 2506, and memory 2508. CPUs 2502A-2502N execute program instructions in order to carry out the functions of the present communications systems and methods. Typically, CPUs 2502A-2502N are one or more microprocessors, such as an INTEL CORE® processor. FIG. 25 illustrates an embodiment in which computer system 2500 is implemented as a single multi-processor computer system, in which multiple processors 2502A-2502N share system resources, such as memory 2508, input/output circuitry 2504, and network adapter 2506. However, the present communications systems and methods also include embodiments in which computer system 2500 is implemented as a plurality of networked computer systems, which may be single-processor computer systems, multi-processor computer systems, or a mix thereof.

Input/output circuitry 2504 provides the capability to input data to, or output data from, computer system 2500. For example, input/output circuitry may include input devices, such as keyboards, mice, touchpads, trackballs, scanners, analog to digital converters, etc., output devices, such as video adapters, monitors, printers, etc., and input/output devices, such as, modems, etc., and sensors 2511, such as those described above. Network adapter 2506 interfaces device 2500 with a network 2510. Network 2510 may be any public or proprietary LAN or WAN, including, but not limited to the Internet.

Memory 2508 stores program instructions that are executed by, and data that are used and processed by, CPU 2502 to perform the functions of computer system 2500. Memory 2508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 2508 may vary depending upon the function that computer system 2500 is programmed to perform. In the example shown in FIG. 25, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present apparatus, systems, and methods may include any and all such arrangements.

In the example shown in FIG. 25, memory 2508 may include sensor interface routines 2512, computation routines 2514, and operating system 2524. Sensor interface routines 2512 may include software routines to obtain sensor data from sensors 2511, according to embodiments described above. Computation routines 2514 may include software routines to compute parameters such as a tilt, a lean, a shift, a rotation, a slide, a position, a movement, and a rotation, etc., of an object, according to embodiments described above. Operating system 2534 may provide overall system functionality.

As shown in FIG. 25, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. An apparatus comprising:
a platform configured to hold at least one object;
a plurality of sensors comprising at least a first sensor and a second sensor attached to the platform, the first sensor configured to detect a first parameter of the at least one object, and the second sensor configured to detect a second parameter of the at least one object; and
a computational device configured to determine a change to the at least one object a first parameter detected by the first sensor, a second parameter detected by the second sensor, and a distance between the first and second sensors.

2. The apparatus of claim 1, wherein the at least one object comprises at least one of a user, a rider, or a payload.

3. The apparatus of claim 1, wherein the computational device is configured to determine at least one of a tilt, a lean, a shift, a rotation, a slide, a position, and a movement of the at least one object based on parameters detected by the first and second sensors.

4. The apparatus of claim 1, wherein the first and second sensors are contact sensors configured to detect parameters in the form of at least one of a weight, a force, a tension, a stress, a change in weight, a change in force, a change in tension, and a change in stress generated by the at least one object.

5. The apparatus of claim 1, wherein the computational device is configured to determine a center of the object in the form of at least one of a center of mass, a center of gravity, a change in the center of mass, and a change in the center of gravity of the object.

6. The apparatus of claim 1, wherein sensors in the plurality of sensors are arranged in a predetermined pattern with fixed positions.

7. The apparatus of claim 1, wherein:
the plurality of sensors is configured to detect parameters of the at least one object over multiple time intervals; and
the computational device is configured to determine a change to the object based on: a first parameter detected at a first time t, a second parameter detected at the first time t, a distance between the sensors detecting the first and second parameter at the first time t, a first parameter detected at a second time t+n, a second parameter detected at the second time t+n, and a distance between the sensors detecting the first and second parameter at the second time t+n.

8. The apparatus of claim 7, wherein the plurality of sensors is configured to:
detect the first parameter at the first time t at the first sensor,
detect the second parameter at the first time t at the second sensor,
detect the first parameter at the second time t+n at either the first sensor or a separate sensor different from the first sensor, and
detect the second parameter at the second time t+n at either the second sensor or a separate sensor different from the second sensor.

9. The apparatus of claim 1, wherein the platform is on one of a ground, a flat surface, or a semi flat surface.

10. The apparatus of claim 9, wherein the platform is a flat surface or semi flat surface in the form of a floor, a wall, a wing or a vehicle surface.

11. The apparatus of claim 1, wherein the platform is a surface of a chair or bed.

12. The apparatus of claim 11, wherein the platform is one of a seating surface, a reclined support surface, a seatback surface, and an arm surface.

13. The apparatus of claim 7, wherein the computational device is configured to
determine a first center of the at least one object at the first time t,
determine a second center of the at least one object at the second time t+n, and
determine a tilt, lean, shift, rotation, slide, or movement of the at least one object from the first time t to the second time t+n based on a difference between the first and second centers of the at least one object at the times t and t+n.

14. The apparatus of claim 13, wherein the computational device is further configured to determine at least one of a magnitude and a direction of the tilt, lean, shift, rotation, slide, or movement of the at least one object.

15. The apparatus of claim 1, wherein the first and second sensors are remote sensors configured to detect parameters in the form of at least one of a distance, a location, a position, a change in distance, a change in location, and a change in position of the at least one object.

16. The apparatus of claim 15, wherein:
the computational device is further configured to use the parameters detected by the first and second sensors to map a three-dimensional representation of the at least one object.

17. The apparatus of claim 1, wherein
the plurality of sensors comprises
contact sensors configured to detect parameters in the form of at least one of a weight, a force, a tension, a stress, a change in weight, a change in force, a change in tension, and a change in stress generated by the at least one object, and
remote sensors configured to detect parameters in the form of at least one of a distance, a location, a position, a change in distance, a change in location, and a change in position of the at least one object; and
wherein the first and second sensors are either contact sensors or remote sensors.

18. The apparatus of claim 17, wherein the computational device is configured to use the parameters detected by the plurality of sensors to map a three-dimensional representation of the at least one object and determine a center of the object.

* * * * *